(12) United States Patent
Wallin et al.

(10) Patent No.: US 11,649,356 B2
(45) Date of Patent: May 16, 2023

(54) 3D PRINTED SILICONE DOUBLE NETWORKS

(71) Applicant: META PLATFORMS TECHNOLOGIES, LLC, Menlo Park, CA (US)

(72) Inventors: Thomas John Farrell Wallin, Kirkland, WA (US); Leif-Erik Sharif Simonsen, Kirkland, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 64 days.

(21) Appl. No.: 17/355,017

(22) Filed: Jun. 22, 2021

(65) Prior Publication Data

US 2021/0317312 A1 Oct. 14, 2021

Related U.S. Application Data

(63) Continuation of application No. 16/144,223, filed on Sep. 27, 2018, now Pat. No. 11,072,705.

(51) Int. Cl.
*C08L 83/04* (2006.01)
*B33Y 70/00* (2020.01)
(Continued)

(52) U.S. Cl.
CPC .............. *C08L 83/04* (2013.01); *B33Y 70/00* (2014.12); *B29C 64/106* (2017.08);
(Continued)

(58) Field of Classification Search
CPC .... C08L 83/04; C08L 2205/025; C08L 83/08; B33Y 70/00; B29K 3083/00; B29K 2105/0014; C08G 77/28; C08G 77/20
See application file for complete search history.

(56) References Cited

U.S. PATENT DOCUMENTS

| 2017/0283655 A1 | 10/2017 | Kenney et al. |
| 2018/0148380 A1 | 5/2018 | Eckel et al. |
| 2018/0244854 A1* | 8/2018 | Drazba ................. C08G 77/12 |

FOREIGN PATENT DOCUMENTS

| CN | 106317898 A * | 1/2017 | ............. B33Y 70/00 |
| CN | 106317898 A | 1/2017 | |
| WO | 2018026829 A1 | 2/2018 | |

OTHER PUBLICATIONS

Machine translation of CN 106317898 (Year: 2017).*
(Continued)

*Primary Examiner* — Catherine S Branch
(74) *Attorney, Agent, or Firm* — Morgan, Lewis & Bockius LLP

(57) ABSTRACT

A polymer composition that includes a blended resin having a viscosity below 10 pascal-seconds before exposure to actinic radiation is provided. The blended resin includes a first base component that is photocurable, and the first base component includes (i) a first siloxane polymer including a plurality of thiol groups and (ii) a second siloxane polymer including a plurality of functional groups with unsaturated carbon-carbon bond. The blended resin also includes a photoinitiator, a second base component that is condensation curable, and a catalyst. The first base component is configured to polymerize into a primary polymer network and the second base component is configured to polymerize into a secondary polymer network. Furthermore, the primary and secondary polymer networks together form an interpenetrating polymer network.

17 Claims, 18 Drawing Sheets
(12 of 18 Drawing Sheet(s) Filed in Color)

(51) Int. Cl.
 *B33Y 10/00* (2015.01)
 *B29C 64/106* (2017.01)
 *B29K 83/00* (2006.01)
 *B29K 105/00* (2006.01)

(52) U.S. Cl.
 CPC .................... *B29K 2083/00* (2013.01); *B29K 2105/0014* (2013.01); *B33Y 10/00* (2014.12); *C08L 2205/025* (2013.01)

(56) References Cited

OTHER PUBLICATIONS

International Preliminary Report on Patentability for International Application No. PCT/US2019/053152, dated Apr. 8, 2021, 7 Pages.
International Search Report and Written Opinion for International Application No. PCT/US2019/053152, dated Dec. 2, 2019, 9 Pages.
Wallin, Office Action, U.S. Appl. No. 16/144,223, dated Jan. 26, 2021, 10 pgs.
Wallin, Notice of Allowane, U.S. Appl. No. 16/144,223, dated May 14, 2021, 7 pgs.

\* cited by examiner

600

| 602 | Blend a first base component, a second base component, and a catalyst to form a blended resin |

| 604 | The blended resin further includes a photoinitiator |

| 606 | The first base component is photocurable and includes (i) a first siloxane polymer comprising a plurality of thiol groups and (ii) a second siloxane polymer comprising a plurality of functional groups with unsaturated carbon-carbon bonds |

| 608 | The first base component further includes a plurality of first siloxane polymer components and/or a plurality of different second siloxane polymer components |

| 610 | The second siloxane polymer includes a plurality of vinyl groups |

| 612 | The first siloxane polymer and/or the second siloxane polymer has a molecular weight below 500,000 Daltons |

| 614 | The first siloxane polymer has a molar thiol density between 2% and 5% |

| 616 | The second base component has less than 1% by weight of vinyl groups and/or thiol groups to minimize inter-network crosslinking with the first base component during polymerization |

| 618 | The second base component is condensation curable via the catalyst |

| 620 | The second base component includes a third siloxane polymer comprising a plurality of silanol groups |

| 622 | The second base component is a Room-Temperature-Vulcanizing (RTV) silicone |

| 624 | The blended resin has a viscosity below 10 pascal-seconds |

| 626 | The first base component is between 10% to 60% by weight of the blended resin |

Figure 6A

Bonded 3D Printed Part 1102

Bonded 3D Printed Part 1102

3D PRINTED SILICONE DOUBLE NETWORKS

RELATED APPLICATIONS

This application is a continuation application of U.S. patent application Ser. No. 16/144,223, filed Sep. 27, 2018, which is incorporated by reference herein in its entirety.

TECHNICAL FIELD

This application relates generally to polymer networks, including but not limited to polymer double networks suitable for 3D printing.

BACKGROUND

Currently, there exist numerous commercial room-temperature-vulcanizing (RTV) silicones with impressive elastomeric properties, chemical resistance, and thermal resistance. The two most common crosslinking mechanisms for RTV silicones are hydrosilylation (platinum catalyzed addition) and condensation (tin catalyzed). Recently, these materials have been used as inks for extrusion-based printing, but the gelation kinetics and rheological properties of the ink limit the print fidelity for both high aspect ratio structures and overhanging features (e.g., the deposited material wets out, slumps, or bleeds prior to curing). Modifications to the chemistry that alter viscosity and/or curing rates fundamentally change the volumetric crosslink density of the material, often to the detriment of the elastomer's performance. Nascent technologies based on kinetically trapping commercial resins as embedded ink within a viscous matrix offers the potential to print designs of greater complexity. However, a viscous matrix complicates path planning and the endemic trade-off in resolution and print speed remains unsolved for direct ink writing techniques.

The free-radical initiated photopolymerization of unsaturated carbon bonds within custom formulations of polysiloxanes offers promise. However, these materials have not demonstrated the combination of desirable mechanical properties inherent to RTV silicones. Unfortunately, the processing requirements of stereolithography (SLA)—rapid photopolymerization from low viscosity ($\eta<5$ Pa·s) resin—precludes conventional strategies for improving the mechanical robustness of these objects. For example, many commercial silicones incorporate particles, such as fumed silica, to improve both ultimate elongation and toughness. However, the loading fractions necessary to see such significant improvements correspond to an increased viscosity well beyond the printable regime. Additionally, the solid particles stiffen the composite, hindering applications that require low moduli of the base polymer. Thus, SLA printing a single silicone network with ideal elastomeric performance remains elusive.

Additionally, soft devices rely on programmed mechanical gradients to direct actuation, provide structural support, or minimize stress concentrations when bonded to rigid substrates. Similarly, in animal systems, biological tissues span at least 3 orders of magnitude in moduli from bone (>1 GPa) to muscle (~10 MPa) to brain tissue (10 kPa). Tough bonding between soft and stiff printed silicones would allow such gradients to be created. However, tough bonding between soft and stiff printed silicones has yet to be demonstrated.

SUMMARY

Accordingly, there is a need for silicone elastomers that work well in 3D printers, such as SLA printers. One solution to the problem is a composition that, when polymerized, forms an interpenetrating polymer network. More specifically, the interpenetrating polymer network is composed of two polymer networks having different mechanical properties. The first polymer network, which may possess insufficient mechanical properties, ensnares a second polymer network that has high elongation, strength, and/or toughness. The purpose of the first polymer network is to provide shape fixity and processability during 3D printing (e.g., the first polymer network quickly polymerizes, at least partially, when exposed to actinic radiation) while the second polymer network provides mechanical robustness when cured. To provide some context, an interpenetrating polymer network includes two distinct percolated networks of polymers homogeneously occupying the same volume. In such an arrangement, one of the networks may be relatively brittle while the other network may be tough. Thus, fracture of the brittle network dissipates energy while the secondary network can remain intact and sustain loading.

(A1) In accordance with some embodiments, the solution explained above can be implemented as a polymer composition. In such implementations, the polymer composition includes a blended resin having a viscosity below 10 pascal-seconds before being exposed to actinic radiation. Further, the blended resin includes (A) a first base component that is photocurable, and the first base component includes a siloxane polymer including a plurality of functional groups with unsaturated carbon-carbon bonds, (B) a photoinitiator, (C) a second base component that is condensation curable, and (D) a catalyst. The first base component is configured to polymerize into a primary polymer network and the second base component is configured to polymerize into a secondary polymer network. Furthermore, the primary and secondary polymer networks together form an interpenetrating polymer network. In some embodiments, the siloxane polymer comprising the plurality of functional groups with unsaturated carbon-carbon bonds is a second siloxane polymer, and the first base component further includes a first siloxane polymer including a plurality of thiol groups.

(A2) In accordance with some embodiments, the solution explained above can be implemented in the following example method. The method includes blending a first base component, a second base component, and a catalyst to form a homogeneously blended resin, where (A) the first base component is photocurable and includes a siloxane polymer comprising a plurality of functional groups with unsaturated carbon-carbon bonds, and (B) the second base component is condensation curable via the catalyst. The method further includes exposing a layer of the blended resin to actinic radiation to polymerize, at least partially, the first base component included in the layer into a primary polymer network. The second base component of the layer polymerizes (e.g., via a condensation reaction) into a secondary polymer network after the primary polymer network is at least partially formed. Furthermore, the primary and secondary polymer networks together form an interpenetrating polymer network in the layer. In some embodiments, the siloxane polymer comprising the plurality of functional groups with unsaturated carbon-carbon bonds is a second siloxane polymer, and the first base component further includes a first siloxane polymer including a plurality of thiol groups.

(A3) In some embodiments of any of A1-A2, the second base component includes a plurality of crosslinkable groups distinct from the plurality of thiol groups and the plurality of functional groups with unsaturated carbon-carbon bonds of the first base component.

(A4) In some embodiments of A3, during polymerization of the first base component, the first siloxane polymer comprising the plurality of thiol groups and the second siloxane polymer comprising the plurality of functional groups with unsaturated carbon-carbon bonds do not compete with the plurality of crosslinkable groups to form chemical crosslinks. For example, the second base component undergoes a chemically orthogonal crosslinking reaction.

(A5) In some embodiments of any of A1-A4, exposing the blended resin to actinic radiation causes the plurality of thiol groups and the plurality of functional groups with unsaturated carbon-carbon bonds to form a cross-linked primary polymer network (e.g., the primary polymer network 120, FIG. 1B(iii)).

(A6) In some embodiments of A5, the catalyst causes the plurality of crosslinkable groups of the second base component to form a cross-linked secondary polymer network, distinct from the cross-linked primary polymer network.

(A7) In some embodiments of any of A1 and A3-A6, the blended resin is configured to be deposited by a print head, and the first base component of a deposited layer is configured to at least partially polymerize into a primary polymer network by exposing the deposited layer to actinic radiation.

(A8) In some embodiments of any of A1-A7, the second siloxane polymer comprises a plurality of vinyl groups.

(A9) In some embodiments of A8, the second base component has less than 1% by weight of vinyl groups and/or thiol groups to minimize inter-network crosslinking with the first base component during polymerization.

(A10) In some embodiments of any of A1-A9, the first base component further includes a plurality of first siloxane polymer components and/or a plurality of different second siloxane polymer components.

(A11) In some embodiments of any of A1-A10, the first siloxane polymer and/or the second siloxane polymer has a molecular weight below 500,000 daltons.

(A12) In some embodiments of any of A1-A11, the first siloxane polymer has a molar thiol density between 2% and 5%.

(A13) In some embodiments of any of A1-A12, the second base component includes a third siloxane polymer comprising a plurality of silanol groups.

(A14) In some embodiments of any of A1-A13, the blended resin further comprises one or more non-reactive diluents, and the one or more non-reactive diluents are up to 80% by weight of the blended resin.

(A15) In some embodiments of any of A1-A14, the blended resin further comprises one or more solid particles, and the one or more solid particulates are up to 50% by weight of the blended resin.

(A16) In some embodiments of any of A1-A2, the primary polymer network in the layer holds a shape of the layer. For example, upon exposing the layer of the blended resin to actinic radiation (e.g., for some predetermined amount of time), the layer undergoes gelation, such that it holds a shape.

(A17) In some embodiments of A2, further comprising, before exposing the layer of the blended resin to actinic radiation: depositing, via a print head, the layer of the blended resin onto a print surface.

(A18) In some embodiments of A17, further comprising, after exposing the layer of the blended resin to actinic radiation: (i) depositing, via the print head, additional layers of the blended resin onto the layer, and (ii) exposing each additional layer to actinic radiation to form a 3D printed part. The primary polymer network provides first mechanical properties to the 3D printed part and the secondary polymer network provides second mechanical properties, different from the first mechanical properties, to the 3D printed part.

(A19) In some embodiments of any of A1-A18, the secondary polymer network of a respective layer forms chemical crosslinks with the secondary polymer network of one or more neighboring layers.

(A20) In some embodiments of any of A1-A19, after exposing the layer of the blended resin to actinic radiation, heating the layer to accelerate polymerization of the second base component in the layer.

(B1) In another aspect, a method is provided to attach printed silicones with mechanical gradients. The method includes providing a 3D printed part that includes: (i) a primary polymer network polymerized by actinic radiation, and (ii) a second polymer network polymerized by a condensation reaction. The secondary polymer network includes unbonded first condensable groups, and the primary and secondary polymer networks together form an interpenetrating polymer network in the 3D printed part. The 3D printed part can correspond to the polymer compositions and methods of any of A1-A20. The method further includes providing a substrate to bond with the 3D printed part, where the substrate includes a surface and unbonded second condensable groups on the surface. The method further includes joining the 3D printed part with the surface of the substrate. Joining the 3D printed part with the surface of the substrate causes the first condensable groups to cohesively bond with the second condensable groups on the surface of the substrate.

(B2) In some embodiments of the method of B1, joining the 3D printed part with the surface of the substrate includes compressing the 3D printed part and the substrate together.

(B3) In some embodiments of the method of B1, the substrate is a liquid, and joining the 3D printed part with the substrate includes depositing the liquid on the 3D printed part.

(B4) In some embodiments of the method of any of B1-B3, the 3D printed part is a first 3D printed part, and the substrate is a second 3D printed part that includes a primary polymer network and a secondary polymer network that together form an interpenetrating polymer network in the second 3D printed part.

(B5) In some embodiments of the method of B4, base components polymerized to form the secondary polymer network in the first 3D printed part differ from base components polymerized to form the secondary polymer network in the second 3D printed part.

(B6) In some embodiments of the method of B5, the secondary polymer network in the first 3D printed part has a first set of mechanical properties, and the secondary polymer network in the second 3D printed part has a second set of mechanical properties that differ from the first set of mechanical properties. In this way, the bonded system has a mechanical gradient that can be used to, e.g., direct actuation. For example, if the first 3D printed part is highly elastic relative to the elasticity of the second 3D printed part, then the joined 3D printed part may be configured to curve (i.e., curl) in a first direction when in a pressurized state.

(B7) In some embodiments of the method of any of B1-B6, before placing the 3D printed part on the surface of the substrate, the method further includes treating the surface of the substrate to introduce the unbonded second condensable groups on the surface of the substrate.

(B8) In some embodiments of B7, the surface of the substrate is an oxidizable metal, and treating the surface of the substrate to introduce the unbonded second condensable groups on the surface includes oxidizing the surface of the substrate.

(B9) In some embodiments of the method of B7, treating the surface of the substrate to introduce the unbonded second condensable groups on the surface includes adding an adhesive that includes the unbonded second condensable groups to the surface of the substrate.

(B10) In some embodiments of the method of any of B1-B6, the substrate is a textile, and the unbonded second condensable groups are innate condensable groups of the textile. Additional unbonded second condensable groups can be introduced to the textile by treating the surface of the textile.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures and specification.

FIGS. 6A-6B show a flowchart of a method for creating a 3D printed part in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

The present disclosure provides polymer compositions and methods of making 3D structures and 3D objects.

Novel Polymer Composition

Figure 1A:
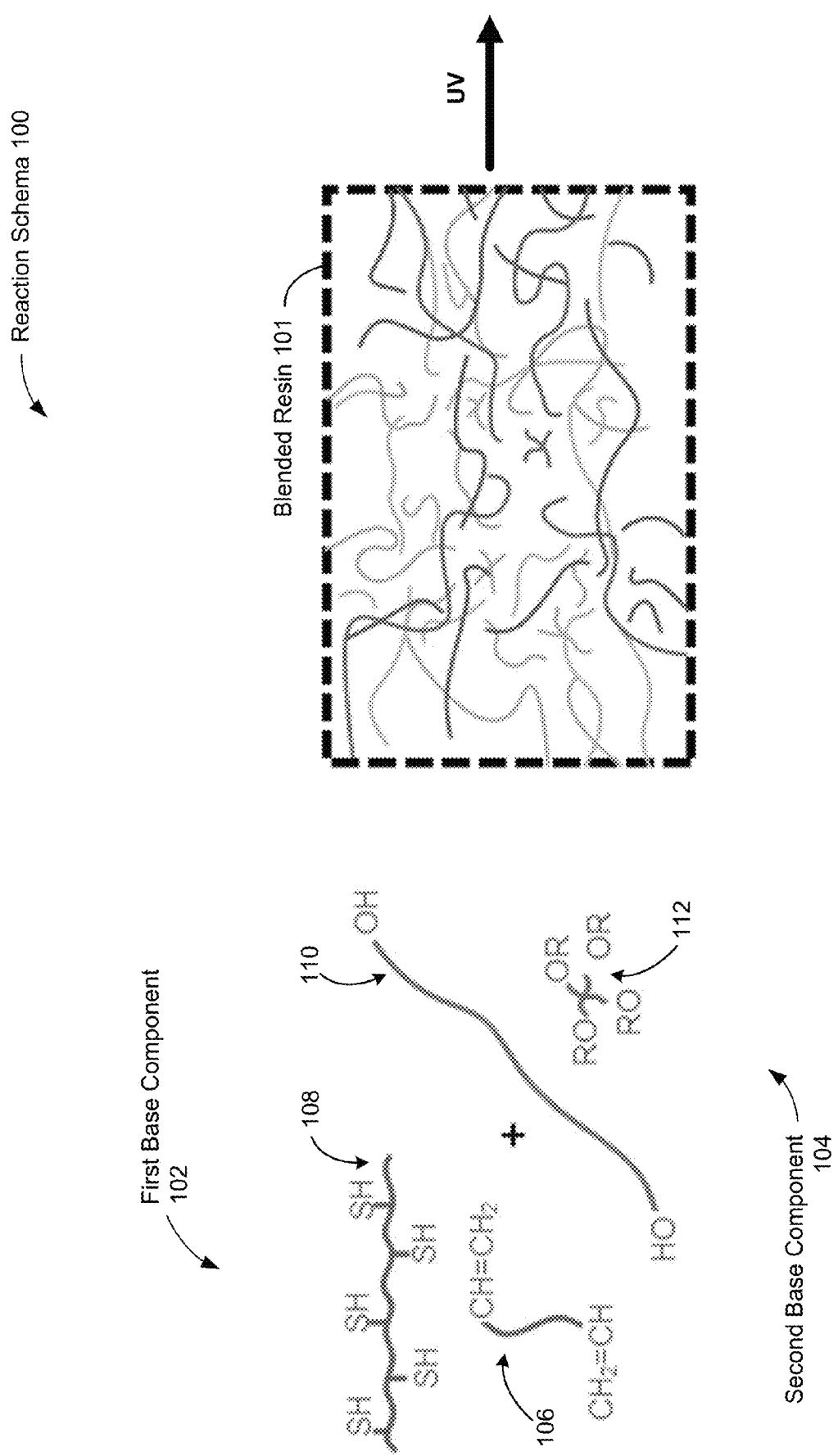
FIGS. 1A and 1B shows a reaction schema of a blended resin in accordance with some embodiments.
Figure 1B:
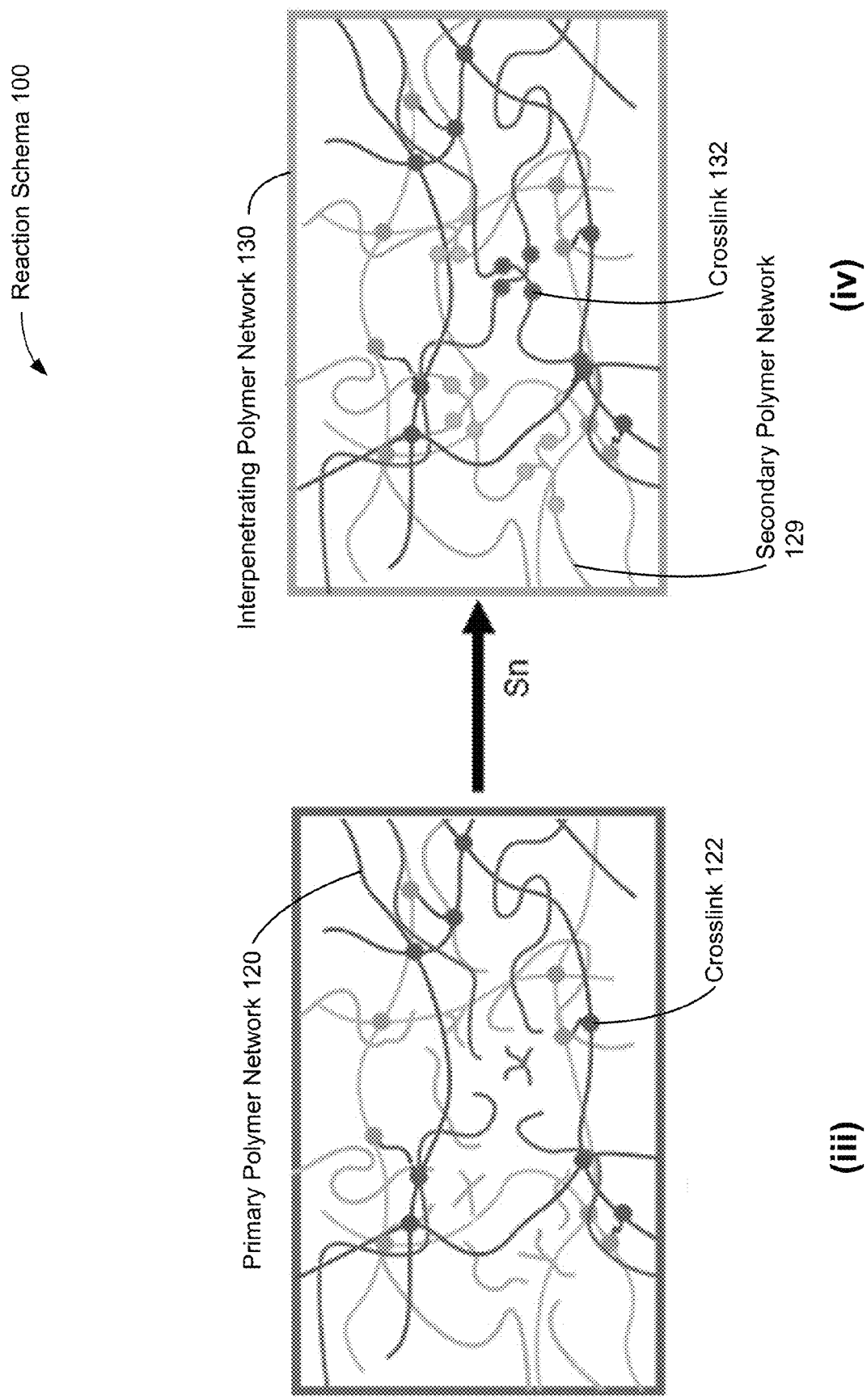

FIGS. 1A and 1B shows a reaction schema 100 of a blended resin 101 in accordance with some embodiments. The blended resin 101 includes a first base component 102 and a second base component 104. FIG. 1A(i) shows example first and second base components 102, 104. The first base component 102 is polymerized into a first (e.g., primary) polymer network using a first process (e.g., actinic radiation) while the second base component 102 is polymerized into a second (e.g., secondary) polymer network using a second process (e.g., a condensation reaction) different from the first process. The first base component 102, when polymerized into the first polymer network, has a first set of mechanical properties (e.g., stiff, rigid) and the second base component 104, when polymerized into the second polymer network, has a second set of mechanical properties (e.g., tough, elastic, strong). The blended resin 101 also includes a catalyst to initiate the second process. In some instances, the first base component 102 is referred to as a "thiolene precursor" and the second base component 104 is referred to as a "condensation precursor."

As will be described in more detail below, the blended resin 101 is configured for use in 3D printers. More specifically, the blended resin 101 has a viscosity suitable for 3D printers, which typically require resins to have viscosities around (or below) approximately 5 Pa*s (up to 10 Pa*s is suitable for some 3D printers). Additionally, a viscosity of the blended resin 101 can be tailored to a specific 3D printer, as described below with reference to FIGS. 2A and 2B. The printability of the blended resin 101 can be attributed to the first base component, which provides low viscosity, rapid gelation, and high reaction conversation to the blended resin 101.

The first and second base components 102, 104, when made into a final part (i.e., when both are polymerized into their respective polymer networks), form an interpenetrating polymer network (sometimes referred to as a "double network"). An "interpenetrating polymer network" is a material where two distinct, non-interacting polymer networks homogenously occupying the same volume (e.g., there is no phase separation on the order of 10 s of nanometers or greater). Put another way, the first base component 102 forms a first polymer network when polymerized, as noted above. Further, the second base component 104 forms a second polymer network that is distinct from the first polymer network, e.g., the second base component 104 undergoes a chemically orthogonal crosslinking reaction. In such a configuration, a cured final part possesses (i) a first set of mechanical properties associated with the first base component 102 and also (ii) a second set of mechanical properties associated with the second base component 104. The first set of mechanical properties provides shape fixity to individual layers of the final part (e.g., each individual layer undergoes rapid gelation). The second set of mechanical properties provides mechanically robustness to the final part (e.g., toughness, elongation, strength, etc.). Mechanical properties associated with the first and second base components 102, 104 are discussed in detail below with reference to FIGS. 3A to 5C.

The first base component 102 includes a first polymer component 106 (e.g., a vinyl polymer component, an acrylate polymer component, a methacrylate polymer component, an allyl polymer component, and the like) and a second polymer component 108 (e.g., a thiol polymer component). Additionally, in some embodiments, the first base component 102 includes a photoinitiator (alternatively, the blended resin 101 can include the photoinitiator). Although not shown, the first base component 102 may include a plurality of first polymer components 106 and a plurality of a second polymer components 108. In the first base component 102, a polymer component can be a functionalized silicone (e.g., functionalized siloxane polymers such as, for example, thiol group or vinyl group functionalized siloxane polymers). A silioxane polymer can be a siloxane copolymer. Examples of functionalized siloxane copolymers include, but are not limited to, mercaptopropyl(methylsiloxane)-dimethylsiloxane copolymers.

The second base component 104 includes a third polymer component 110 and a fourth polymer component 112. Although not shown, the second base component 104 may include a plurality of third polymer components 110 and a plurality of fourth polymer components 112. Like the first base component 102, polymer components in the second base component 104 can be functionalized liquid silicones and liquid silicone rubber precursors. Importantly, the second base component 104 has less than 1% by weight of unsaturated carbon-carbon bonds and/or thiol groups to minimize inter-network crosslinking with the first base component 102. In some embodiments, the second base component 104 is a room-temperature-vulcanizing (RTV) silicone that includes hydroxyl groups (e.g., the third polymer component 110) and alkoxy groups (e.g., the fourth polymer component 112). It is noted that various RTV silicones may be used as the second base component 104 so long as those RTV silicones have high elongation, strength, and/or toughness. In some embodiments, the second base component 104 includes silanol functionalized polysiloxanes and other multifunctional siloxane crosslinkers. Example multifunctional crosslinkers include alcohol, acetoxy, enoxy, oxime, alkoxy, hydride, and amine based systems. Further, the second base component 104 may also include a catalyst (i.e., catalytic species) (alternatively, the blended resin 101 can include the catalyst).

As will be discussed in greater detail below with reference to FIG. 3A, a ratio between the first base component 102 and the second base component 104 in the blended resin 101 effects the properties of the blended resin 101 itself (e.g., viscosity), and also properties of a final part made from the blended resin 101.

In some embodiments, the first polymer component 106 includes one or more functional groups with unsaturated carbon-carbon bonds, aside from the vinyl groups illustrated in FIG. 1A(i). These other functional groups with unsaturated carbon-carbon bonds can include acrylate, vinyl ether, methacrylate, allyl, and the like. For ease of discussion, the first polymer component 106 is sometimes referred to herein as a "vinyl polymer component." One skilled in the art will appreciate that "vinyl" in the discussion below may be replaced (or supplemented) with various other functional groups with unsaturated carbon-carbon bonds, such as the examples provided above.

The vinyl polymer component 106 includes a plurality of vinyl groups, which can be terminal groups. The vinyl groups can undergo an alkyl hydrothiolation reaction (e.g., in response to being exposed to actinic radiation) or the vinyl groups can undergo alkylation (e.g. in response to being exposed to actinic radiation). In some embodiments, the vinyl polymer component 106 is an elastomer. In such embodiments, the vinyl polymer component has 2 to 30 vinyl groups, including all integer number of vinyl groups and ranges therebetween.

In some embodiments, the vinyl polymer component 106 can be a siloxane polymer comprising a plurality of vinyl groups. The vinyl groups can be terminal vinyl groups, pendant vinyl groups, or a combination thereof. Moreover, the vinyl groups can be randomly distributed or distributed in an ordered manner on individual siloxane polymer chains. Further, the siloxane polymer comprising a plurality of vinyl groups can be linear or branched. In addition, the siloxane polymer comprising a plurality of vinyl groups can have a molecular weight (Mn or Mw) of 186 g/mol to 50,000 g/mol, including all integer g/mol values and ranges there between. In another example, the siloxane polymer can have a molecular weight (Mn or Mw) of 186 g/mol to 175,000 g/mol, including all integer g/mol values and ranges there between.

The second polymer component 108 is sometimes referred to herein as a "thiol polymer component." The thiol polymer component 108 can include a plurality of thiol groups, as shown in FIG. 1A(i). The thiol groups can be terminal groups. The thiol polymer component 108 and its thiol groups can be referred to as mercapto polymer components and mercaptan groups, respectively. The thiol groups can undergo an alkyl hydrothiolation reaction (e.g., in response to being exposed to actinic radiation). In some embodiments, the thiol polymer component 108 is an elastomer. In such embodiments, the thiol polymer component 108 can have 2 to 30 thiol groups, including all integer number of thiol groups and ranges therebetween.

In some embodiments, the thiol polymer component 108 can be a siloxane polymer comprising a plurality of thiol groups. In one example, the siloxane polymer is a (mercaptoalkyl)methylsiloxane-dimethylsiloxane copolymer, where, the alkyl group is a C1 to C11 alkyl group. A non-limiting example of a (mercaptoalkyl)methylsiloxane-dimethylsiloxane copolymer is mercaptopropyl(methylsiloxane)-dimethylsiloxane copolymer. The thiol groups can be terminal groups, pendant groups, or a combination thereof. The thiol groups can be randomly distributed or distributed in an ordered manner on the individual siloxane polymer chains. The siloxane polymer comprising a plurality of thiol groups can be linear or branched. In addition, the siloxane polymer comprising a plurality of thiol groups can have a molecular weight (Mn or Mw) of 186 g/mol to 50,000 g/mol, including all 0.1 g/mol values and ranges therebetween. In another example, the siloxane polymer comprising a plurality of thiol groups can have a molecular weight (Mn or Mw) of 186 g/mol to 175,000 g/mol, including all 0.1 g/mol values and ranges therebetween. In another example, the siloxane polymer comprising a plurality of thiol groups can have a molecular weight (Mn or Mw) of 268 g/mol to 50,000 g/mol, including all 0.1 g/mol values and ranges therebetween. In another example, the siloxane polymer can have a molecular weight (Mn or Mw) of 268 g/mol to 175,000 g/mol, including all 0.1 g/mol values and ranges therebetween.

The thiol polymer component 108 (e.g., a siloxane polymer comprising a plurality of thiol groups) can have various amounts of thiol groups. In various examples, the thiol polymer component 108 has 0.1-6 mol % thiol groups, including all 0.1 mol % values and ranges therebetween. In other examples, the thiol polymer component 108 has 0.1-5 mol %, 0.1-4.9 mol %, 0.1-4.5 mol % thiol groups, 0.1-4 mol %, or 0.1-3 mol % thiol groups. In other examples, the thiol polymer component 108 has 0.5-5 mol %, 0.5-4.9 mol %, 0.5-4.5 mol % thiol groups, 0.5-4 mol %, or 0.5-3 mol % thiol groups. In some embodiments, the thiol polymer component 108 has between 0.1-10 mol % thiol groups, including all 0.1 mol % values and ranges therebetween. In some embodiments, the thiol polymer component 108 has between 0.1-100 mol % thiol groups, including all 0.1 mol % values and ranges therebetween.

In some embodiments, the first polymer component 106 and/or the second polymer component 108 can have one or more non-reactive side groups (e.g., groups that do not react in a reaction used to pattern the polymer composition). Examples of non-reactive side groups include, but are not limited to, alkyl groups and substituted alkyl groups such as, for example, methyl, ethyl, propyl, phenyl, and trifluoropropyl groups.

The blended resin 101 can include a plurality of different vinyl polymer components 106 and/or a plurality of thiol polymer components 108. In addition, the blended resin 101 can include linear and/or branched vinyl polymer components and/or linear or branched thiol polymer components. It is desirable that the blended resin 101 include at least one branched monomer unit (e.g., one or more branched vinyl polymer component and/or one or more branched thiol polymer component) which can form a network structure (e.g., the first polymer network). It is considered that by using different combinations of linear and/or branched polymer components polymerized materials (e.g., 3D printed structures) can have different properties (e.g., mechanical, optical, and chemical properties).

The amount of vinyl polymer component(s) 106 and thiol polymer component(s) 108 can vary. The individual polymer components can be present at 0.5% to 99.5% by weight, including all 0.1% values and ranges therebetween. In various examples, the vinyl polymer component(s) 106 are present at 3% to 85% by weight and/or the thiol polymer component(s) 108 are present at 15% to 97% by weight. In these examples, the stoichiometric ratio of thiol groups to vinyl groups in the blended resin 101 is 1:1. In various other examples, the stoichiometric ratio of thiol groups to vinyl groups in the blended resin 101 is from 26:1 to 1:26, 20:1 to 1:20, 15:1 to 1:15, 10:1 to 1:10, 5:1 to 1:5, 4:1 to 1:4, 3:1 to 1:3, or 2:1 to 1:2. These changes can yield different mechanical properties by affecting, for example, the crosslink density, distance between crosslinks, and degree of polymerization for the printed material.

In some embodiments, the thiol polymer component 108 is a poly-(mercaptopropyl)methylsiloxane-co-dimethylsiloxane polymer. In various examples, this polymer system has 2-3 mole % or 4-6 mole % mercaptopropyl groups with a total molecular weight of 6000-8000. The pendant mercaptopropyl groups are located randomly among the siloxane backbone. For example, the alkenes used in the thiolene chemistry are low viscosity polydimethylsiloxanes terminated on both ends by vinyl (—CH═CH2) groups with total molecular weights (Mn) of, for example, 186, 500, 6000, 17200, or 43000. These components are added in, for example, a 1:1 stoichiometric ratio of mercaptopropyl to vinyl groups depending on the desired mechanical properties of the resulting object (e.g., 3D Printed Part 206, FIG. 2A). To this blend, a photoinitiator (e.g., 10% by weight of a 100 mg/mL diphenyl(2,4,6-trimethylbenzoyl)phosphine oxide in toluene) is added. Centrifugal mixing at, for example, 2000 rpm for 30 seconds provides a homogenous mixture, particularly for the high molecular weight components. A small amount (0.5% by weight) of absorptive species, like Sudan Red G, can be added as a photoblocker to limit cure depth to the desired build layer height.

Various photoinitiators can be used, along with various mixtures of photoinitiators. The chemistry of the materials in the blended resin 101, and finished polymer, is not dependent on the type of or specific photoinitiator used. It is desirable that the photoinitiator and polymer components are at least partially miscible in each other or a suitable solvent system. It is desirable that the absorption of the photoinitiator overlap with the wavelength (e.g., 300 to 800 nm) of the radiation source (e.g., illumination source 202, FIG. 2A) used to photocure the polymer composition. Examples of photoinitiators include, but are not limited to, UV Type I photoinitiators, UV Type II, and visible photoinitiators. Examples of UV Type I photoinitiators include, but are not limited to, benzoin ethers, benzyl ketals, α-dialkoxy-acetophenones, α-hydroxy-alkyl-phenones, α-amino alkyl-phenones, acyl-phosphine oxides, and derivatives thereof. Examples of UV Type II photoinitiators include, but are not limited to, include benzo-phenones/amines, thio-xanthones/amines, and derivatives thereof. Examples of visible photoinitiators include, but are not limited to titanocenes, flavins and derivatives thereof. Photoinitiator(s) can be present at various amounts in the compositions. In various examples, photoinitiator(s) are present in the polymer composition at 0.01 to 10% by weight, including all 0.01% values and ranges therebetween, based on the weight of polymer components and photoinitiator(s) in a composition.

The blended resin 101 can further include one or more solvents (e.g., non-reactive diluents). Examples of solvents include, but are not limited to, toluene, tetrahydrofuran, hexane, acetone, ethanol, water, dimethyl sulfoxide, pentane, cyclopentane, cyclohexane, benzene, chloroform, diethyl ether, dichloromethane, ethyl acetate, dimethylformamide, methanol, isopropanol, n-proponal, and butanol. In some embodiments, the one or more non-reactive diluents are up to 80% by weight of the blended resin. Solvents can be used to improve mixability of components in the blended resin 101.

The blended resin 101 can further include one or more additives (e.g., solid particles). Examples of additives include, but are not limited to, diluents, non-reactive additives, nanoparticles, absorptive compounds, and combinations thereof. For example, an absorptive compound is a dye, which, if they absorb in the spectral range used to polymerize the polymer composition can be photoblockers, such as, for example, Sudan Red G. It is desirable that the additives be soluble in the blended resin 101. Examples of additives include, but are not limited to, metallic nanoparticles such as, for example, iron, gold, silver and platinum, oxide nanoparticles such as for example, iron oxide ($Fe_3O_4$ and $Fe_2O_3$), silica ($SiO_2$), and titania ($TiO_2$), diluents such as, for example, silicone fluids (e.g., hexamethyldisiloxane and polydimethysiloxane), non-reactive additives or fillers such as, for example, calcium carbonates, silica, and clays, absorptive compounds such as, for example, pigments (e.g., pigments sold under the commercial name "Silc Pig" such as, for example, titanium dioxide, unbleached titanium, yellow iron oxide, mixed oxides, red iron oxide, black iron oxide, quinacridone magneta, anthraquinone red, pyrrole red, disazo scarlet, azo orange, arylide yellow, quinophthalone yellow, chromium oxide green, phthalocyanine cyan, phthalocyanine blue, cobalt blue, carbazole violet and carbon black). In some embodiments, the one or more additives are up to 50% by weight of the blended resin.

As shown after FIG. 1A(ii), the blended resin 101 is exposed to ultra-violet (UV) radiation. Upon doing so, the first base component 102, at least partially, polymerizes to form a primary (initial, first) polymer network 120, as shown in FIG. 1B(iii). More specifically, a respective first polymer component 106 reacts with a respective second polymer component 108 as a result of being exposed to the UV radiation. As an example, upon exposure to radiation, one or more vinyl groups 108 react with one or more thiol groups 106 to form an alkeynyl sulfide (i.e., a vinyl group and thiol group undergoes a hydrothiolation reaction). The following equation can represent the reaction (sometimes referred to herein as a "click reaction") between the polymers of the first base component 102:

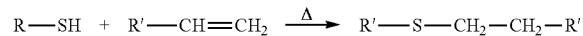

where Δ represents the UV radiation. This is a highly exothermic reaction that proceeds rapidly and in high yield. This photoinitiated thiol-ene reaction yields a homogenous polymer network that can show reduced shrinkage and exhibit a rapid increase in gel fraction over small photodosages. Unlike photopolymers based on chain growth polymerization of vinyl/acrylate/methacrylate groups, where undesired propagation reactions can continue for days after gelation, a free radical generated on the alkene is immediately satisfied by a hydrogen abstraction from the thiol.

As shown in FIG. 1B(iii), crosslinking 122 occurs between the first and second polymer components 106, 108 such that the primary polymer network 120 is formed (at least partially). Due to the rapid polymerization of the first base component 102 into the primary polymer network 120, the primary polymer network 120 holds a shape after a relatively short exposure to UV radiation (e.g., FIG. 1B(iii) represents a state of a layer of the blended resin 101 immediately after exposure to UV radiation for approximately 1-2 seconds). Furthermore, the primary polymer network 120 is stiff when partially polymerized, and therefore is well-suited for holding a shape. Consequently, the blended resin 101 is suitable for 3D printing applications as a layer of the blended resin 101 can solidify (or at least gel) quickly (i.e., the primary polymer network 120 prevents a layer from bleeding or slumping).

In some embodiments, exposing (or illuminating) the first base component 102 to UV radiation can be performed as a blanket (i.e., flood) exposure or a patterned (e.g., lithographic or direct write) exposure. Electromagnetic radiation used in the exposing can have a wavelength or wavelengths from 300 to 800 nm, including all integer values and ranges therebetween. In various examples, the exposing (or illumination) is carried out using UV LED lights or lasers (e.g., such as those found in Ember by Autodesk and Formlabs 1, 1+ and 2 printers (405 nm)) or mercury and metal halide lamps (e.g., such as those found in high definition projectors (300-800 nm).

In some embodiments, exposing the first base component 102 to actinic radiation can be carried out for various times. In various examples, the exposing is carried out for 0.005-30 seconds, including all 0.001 second values and ranges therebetween. A required exposure time depends on print parameters such as, for example: layer height, cross sectional area, power intensity of the printer, wavelength of light source, concentration of photoinitiator, etc. Exposure times for the first base component 102 are discussed in further detail below with reference to FIGS. 3A-3B.

Figure 2A:
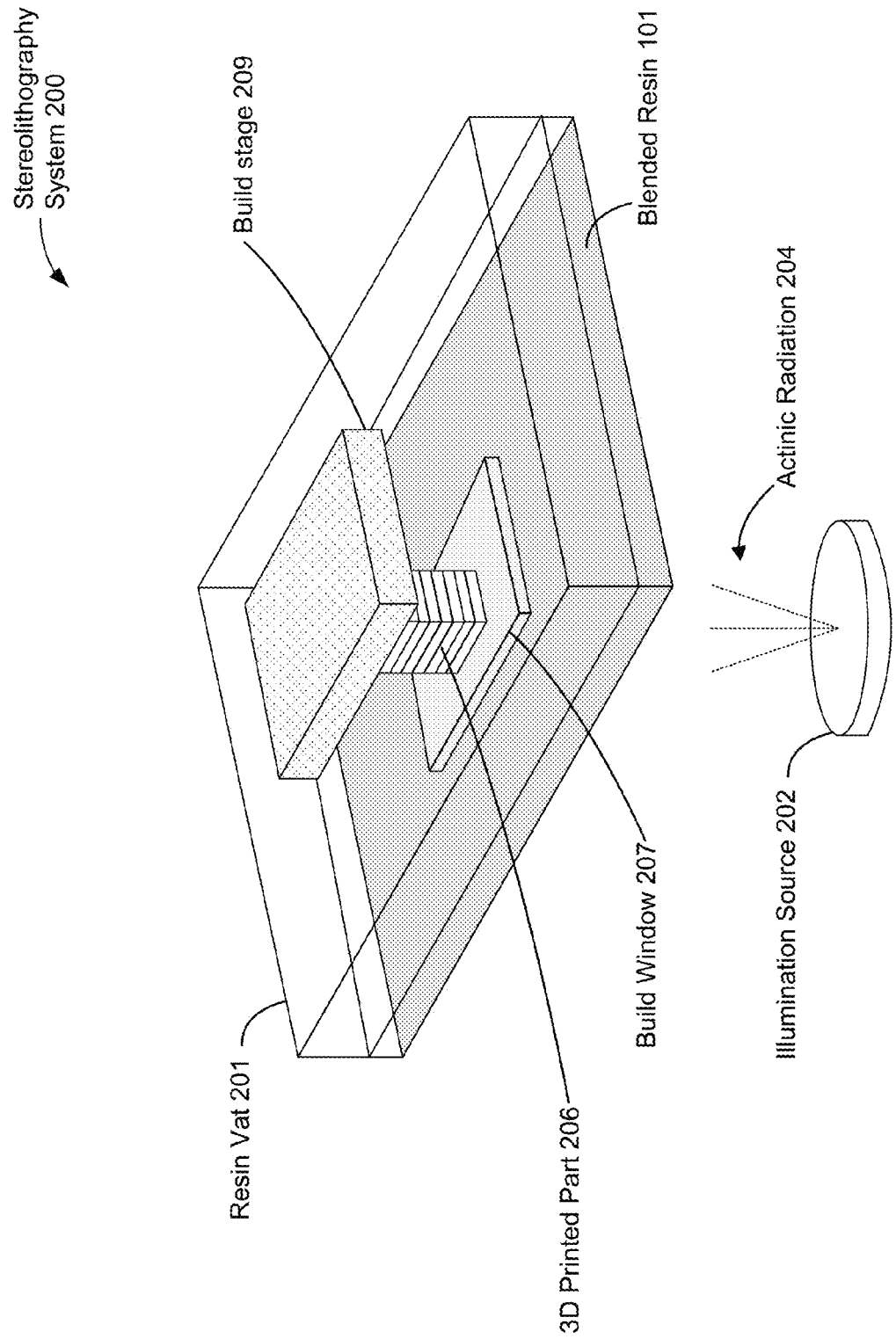
FIG. 2A is a simplified stereolithography printer in accordance with some embodiments.
Figure 2B:
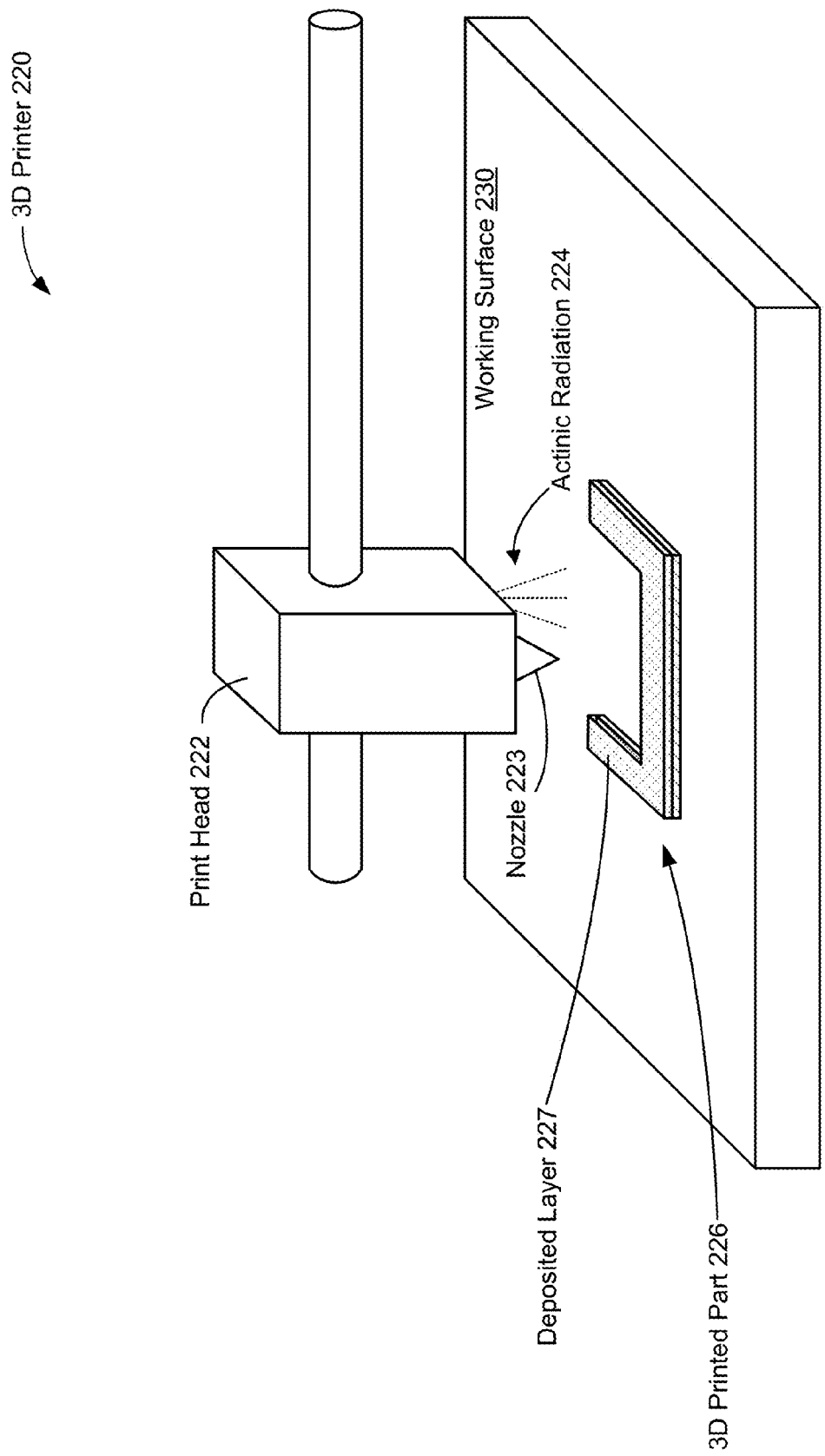
FIG. 2B is a simplified ink-based 3D printer in accordance with some embodiments.

In some embodiments, exposing the first base component 102 to actinic radiation is performed by a 3D printer, such as the printers shown in FIGS. 2A and 2B. FIG. 2A shows a simplified stereolithography system 200 that includes an illumination source 202. FIG. 2B shows a simplified ink-based 3D printer 220 that includes an illumination source.

FIG. 1B(iv) shows a final part with an interpenetrating polymer network 130 formed when the first and second base components 102, 104 are both at least partially polymerized. As shown, crosslinking 132 occurs between the third and fourth polymer components 110, 112 such that a secondary polymer network 129 is formed. The secondary polymer network 129 is formed by a step-addition condensation reaction. A catalyst included in the blended resin 101 initiates and/or accelerates this condensation reaction. Furthermore, in some embodiments, a thermal treatment at temperatures between 65 and 200° C. may also be used to initiate and/or accelerate the condensation reaction. The secondary polymer network 129 provides the interpenetrating polymer network 130 with high elongation, strength, and/or toughness, relative to the primary polymer network 120. Accordingly, the main purpose of the primary polymer network 120 is to solidify each layer of a 3D printed part (e.g., a 3D printed part may be composed of multiple layers, where each layer is rapidly solidified by the primary polymer network 120). Furthermore, the main purpose of the secondary polymer network is to provide mechanical robustness to the interpenetrating polymer network 130 (e.g., without the secondary polymer network, a final 3D printed part would be more brittle and easily breakable). Thus, the primary and secondary polymer networks are used for two different purposes, and together, the primary and secondary polymer networks overcome problems encountered in 3D printing applications.

FIG. 2A is a simplified stereolithography printer 200 in accordance with some embodiments. Stereolithography is an additive manufacturing technique that uses photoirradiation (e.g., selective or blanket) to cure a liquid resin of photopolymerizable material (e.g., the first base component 102). By repeating this process, layer-by-layer, a solid object forms.

As shown in FIG. 2A, the stereolithography printer 200 includes a resin vat 201 holding the blended resin 101. The stereolithography printer 200 also includes a build window 207 and an illumination source 202 directed at a first surface of the build window 207. The build window 207 is a solid, translucent layer that allows light to enter the resin vat and photopolymerize the blended resin 101. The blended resin 101 covers the second surface of the build window 207, and when the illumination source 202 directs actinic radiation 204 at the first surface of the build window 207, the actinic radiation 204 passes through the build window 207 and polymerizes a thin layer of the blended resin 101 on the second surface of the build window 207. Specifically, the actinic radiation 204 partially polymerizes the first base component 102 in the blended resin 101 and the second base component 104 slowly polymerizes thereafter, via a catalyst. The cured material preferentially adheres to the build stage 209 (and/or previously cured material), and the build stage 209 is configured to move away from the build window 207 after the illumination source 202 directs the actinic radiation 204 at the first surface of the build window 207. For example, the build stage 209 is raised approximately a thickness of the thin layer, and the blended resin 101 again covers the second surface of the build window 207. The process described above is repeated until the 3D printed part 206 is formed. As shown, the 3D printed part 206 is composed of multiple layers.

It is noted that FIG. 2A covers a "bottom-up" stereolithography printer. The blended resin 101 described herein performs equally well in "top-down" stereolithography printers, where UV radiation is transmitted through the air-liquid interface at the top of a vat of liquid resin and the build stage is lowered down into the vat after each exposure step.

FIG. 2B is a simplified ink-based 3D printer 220 in accordance with some embodiments. The ink-based 3D printer 220 operates differently from the stereolithography printer 200 shown in FIG. 2A. For example, the ink-based 3D printer 220 includes a print head 222 that is configured to deposit an ink layer on a working surface 230. The deposited first ink layer is then exposed to UV radiation to partially cure the deposited first ink layer. Thereafter, the print head 222 is raised approximately a thickness of the deposited ink layer (or the working surface 230 is lowered approximately a thickness of the deposited ink layer), and the print head 222 deposits another ink layer 227 on the first ink layer, at least partially. The process described above is repeated until the 3D printed part 226 is formed. As shown, the 3D printed part 226 is composed of multiple layers.

The blended resin 101 (the "ink") may be housed in the print head 222 (e.g., the blended resin 101 may be housed in an ink cartridge, or some other apparatus, such as a hopper). The print head 222 also includes a nozzle 223 that deposits the blended resin and an illumination source that directs actinic radiation 224 at the working surface 230. In some embodiments, the illumination source in configured to follow a path of the nozzle 223, and focus the actinic radiation 224 at the nozzle 223 (e.g., directly at the nozzle 223 or offset from the nozzle 223). In doing so, the ink (i.e., deposited portion of the blended resin 101) is not able to bleed or run, as noted above, due to the rapid gelation of the primary polymer network.

In some embodiments, a viscosity of the blended resin 101 is adjusted (i.e., tailored) to a particular 3D printer. For example, various solvents and/or additives can be added to the blended resin 101 so that the viscosity of the blended resin is suitable for the ink-based 3D printer 220. Moreover, respective percentages of the first base component 102 and the second base component 104 (as well as their respective polymer components) in the blended resin 101 can be adjusted to achieve the desired viscosity. Additionally, in some embodiments, when the blended resin 101 is deposited by the ink-based 3D printer 220, an aggressive photoinitiator is included in the blended resin 101 (e.g., the photoinitiator reduces a gel transition time of the first base component 102). In this way, bleeding of ink deposited by the print head 222 can be further reduced.

Figure 3A:
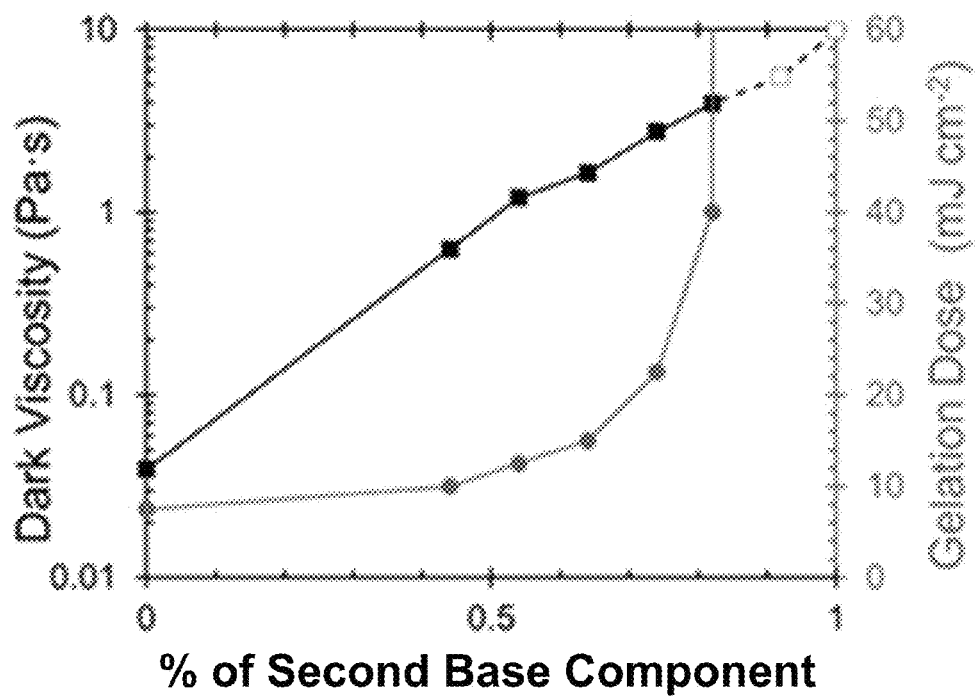
FIG. 3A shows a behavior of the blended resin during a 3D printing operation in accordance with some embodiments.

FIG. 3A shows a behavior of the blended resin 101 during a 3D printing operation in accordance with some embodiments. The X-axis represents a ratio between the first base component 102 and the second base component 104 in the blended resin 101. For example, "0" on the X-axis represents a situation where the blended resin 101 includes only the first base component 102 and "1" on the X-axis represents a situation where the blended resin 101 includes only the second base component 104. The two Y-axes represent results from varying the ratio. Specifically, the left Y-axis represents a viscosity of the blended resin 101 as the ratio changes, and the right Y-axis represents a photodosage necessary to cure (at least partially) the blended resin 101 into a solid object when exposed to a light source (e.g., a 400-500 nm, 10 mW/cm$^2$ light source) as the ratio changes.

As shown, the blended resin 101 becomes more viscous as a percentage of the first base component 102 in the blended resin 101 decreases (i.e., the second base component 104 thickens the blended resin 101). Additionally, a photodosage necessary to cure the blended resin 101 increases as a percentage of the first base component 102 in the blended resin 101 decreases. Thus, the blended resin 101 may be uncurable (and unsuitable for 3D printing applications) when the blended resin 101 contains below a threshold amount of the first base component 102, such as below approximately 10% by weight of the first base component 102.

Table 1 below shows photorheological properties of blended resins 101 as the ratio between the first component 102 and the second base component 104 is varied. Each of the condensation silicones (i.e., the MOLDMAX materials) listed in Tables 1 and 2 are produced by REYNOLDS ADVANCED MATERIALS. Dark viscosity is the viscosity measured immediately prior to photoexposure. Gel dosage corresponds to the total photoirradiation required for crossover between the storage (G') and loss moduli (G") (e.g., the "gelation" point shown in FIG. 3A). Data was collected through oscillatory shear rheology between two 20 mm parallel plates at a gap of 250 microns, a frequency of 2 Hz, and a strain of 1%.

TABLE 1

| | Weight % Second Base Component 104 | Dark Viscosity (Pa·s) | Gel Dosage for Cure (mW cm$^{-2}$), λ = 405 nm |
|---|---|---|---|
| Moldmax 10T | 1 | 9.79 | >1600 |
| | 0.92 | 5.54 | >1600 |
| | 0.82 | 3.93 | 40 |
| | 0.74 | 2.76 | 22.5 |
| | 0.64 | 1.65 | 15 |
| | 0.54 | 1.20 | 12.5 |
| | 0.44 | 0.63 | 10 |
| Moldmax 14NV | 1 | 6.95 | >1600 |
| | 0.92 | 1.31 | >1600 |
| | 0.82 | 0.76 | 50 |
| | 0.74 | 0.61 | 22.5 |
| | 0.64 | 0.42 | 15 |
| | 0.55 | 0.35 | 10 |
| | 0.44 | 0.29 | 10 |
| Moldmax 29NV | 1 | 2.21 | >1600 |
| | 0.92 | 1.27 | >1600 |
| | 0.82 | 0.89 | 35 |
| | 0.74 | 0.40 | 15 |
| | 0.64 | 0.35 | 12.5 |
| | 0.55 | 0.23 | 10 |
| | 0.44 | 0.11 | 10 |
| Moldmax 40 | 1 | 25.73 | >1600 |
| | 0.92 | 14.37 | >1600 |
| | 0.82 | 8.35 | >1600 |
| | 0.74 | 5.84 | 15 |
| | 0.69 | 3.96 | 12.5 |
| | 0.64 | 3.22 | 12.5 |
| | 0.54 | 1.81 | 10 |
| | 0.44 | 1.15 | 10 |
| Thiolene | 0 | 0.04 | 7.5 |

In some instances, a viscosity greater than 5 Pa·s is an upper limit for stereolithography. In some other instances, a viscosity greater than 10 Pa·s is an upper limit for stereolithography. Whichever the case, in those instances where the viscosity of the blended resin 101 is impractical for printing, shear thinning or other strategies can be applied to lower viscosity for printing. Additionally, a gel dosage greater than 1600 mW cm$^{-2}$, which corresponds to approximately 80 seconds of exposure per layer in conventional stereolithography, can be impractical for printing.

Figure 3B:
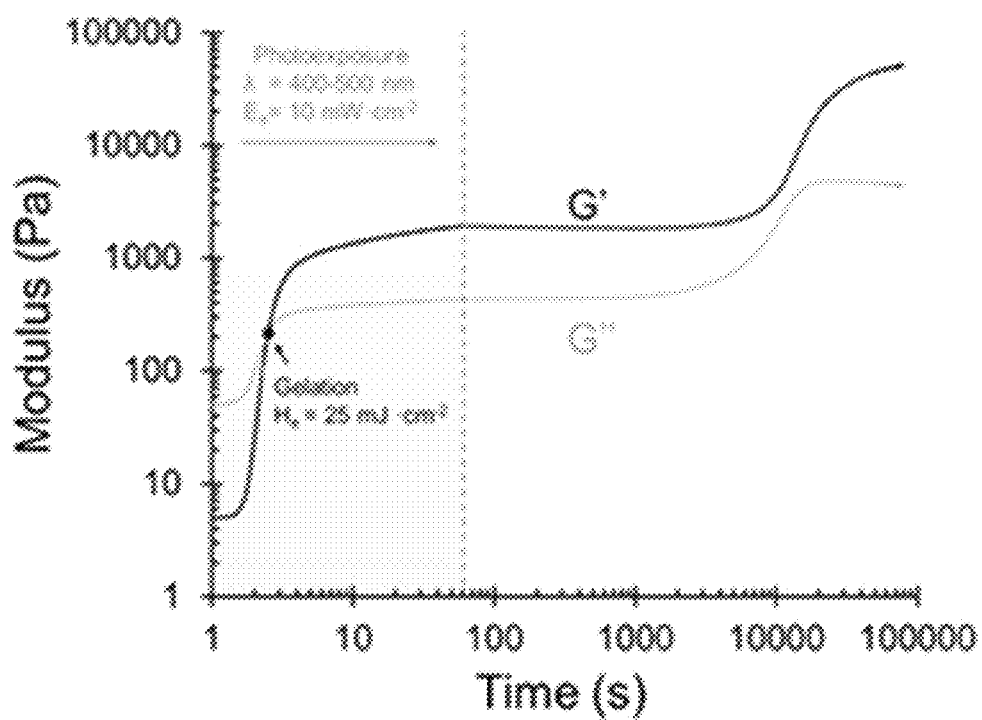
FIG. 3B shows a curing behavior of the blended resin during a 3D printing operation in accordance with some embodiments.

FIG. 3B shows a behavior of the blended resin 101 during a 3D printing operation in accordance with some embodiments. In this particular embodiment, the blended resin 101 includes 18 percent of the first base component 102 and 82 percent of the second base component 104. The X-axis represents time (in seconds) and the Y-axis represents a resulting modulus of elasticity of a curing part. The light source is this embodiment is a 400-500 nm, 10 mW/cm$^2$ light source.

As shown, the blended resin 101 is exposed to the light source for 60 seconds (shaded area). During this time frame, gelation occurs within the first few seconds. The "gelation" point shown in FIG. 3B corresponds to the partial polymerization shown in FIG. 1B(iii). Thus, at the gelation point, the blended resin 101 is able to hold a shape as the primary polymer network 120 shown in FIG. 1B(iii) is at least partially formed. Furthermore, as time continues in FIG. 3B (the light source is turned off after 60 seconds), storage module (G') (black line) and loss modulus (G") (gray line) of the partially cured part both increase. As explained above with reference to FIGS. 1A and 1B, the second base component 104 slowly polymerizes into a secondary polymer network during a step-addition condensation reaction that provides a final part with specific mechanical properties, such as strength, elongation, and/or toughness. Storage modulus is a measure of the elastic behavior of the material while loss modulus is a measure of the viscous dissipation.

Figure 4B:
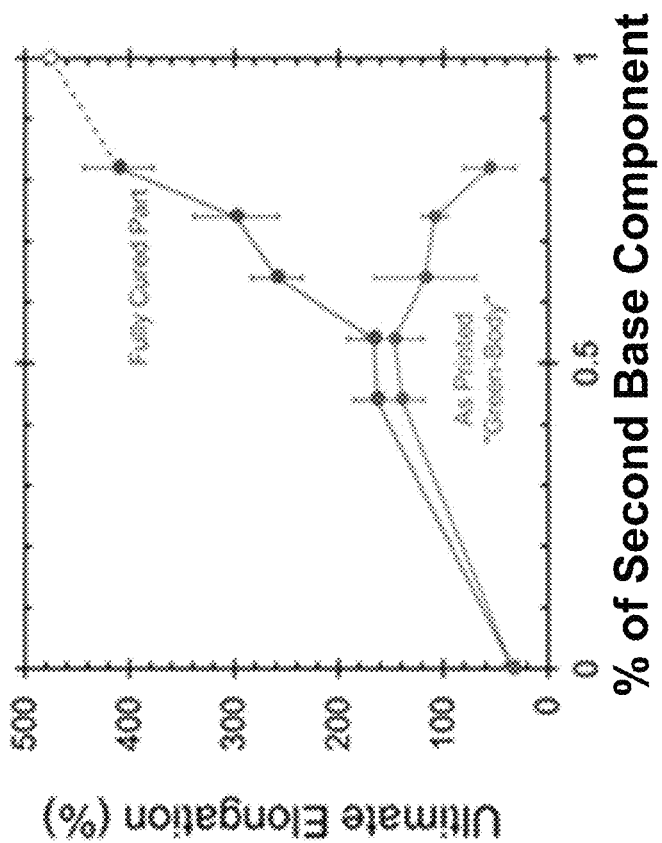
FIGS. 4A and 4B show mechanical behaviors of the blended resin during a 3D printing operation in accordance with some embodiments.
Figure 4A:
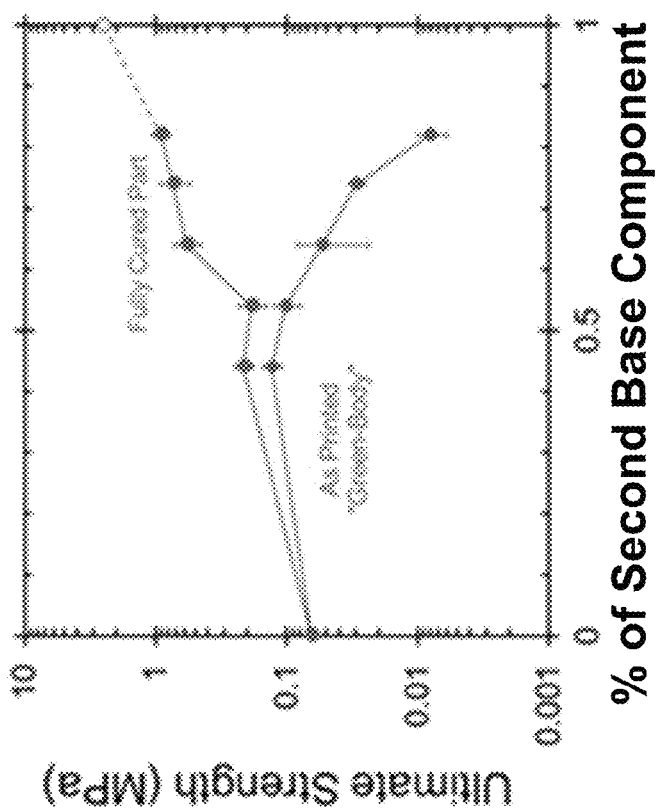

FIGS. 4A and 4B show behaviors of the blended resin 101 during a 3D printing operation in accordance with some embodiments. The X-axis represents a ratio between the first base component 102 and the second base component 104 in the blended resin 101. For example, "0" on the X-axis represents a situation where the blended resin 101 includes only the first base component 102 and "1" on the X-axis represents a situation where the blended resin 101 includes only the second base component 104. In FIG. 4A, the Y-axis represents the resulting ultimate strength (A/Pa) of a partially cured part (green) and a fully cured part (blue). In FIG. 4B, the Y-axis represents the resulting ultimate elongation (%) of a partially cured part (green) and a fully cured part (blue). A "partially cured part" refers to a part where the secondary polymer network has not yet formed, such as the "green body" shown in FIG. 1B(iii), where only the primary polymer network 120 is formed.

As shown in FIG. 4A, the ultimate strength of a fully cured part (blue) increases as a percentage of the second base component 104 in the blended resin 101 increases. The opposite is true for the ultimate strength of a partially cured part (green), which decreases as a percentage of the second base component 104 in the blended resin 101 increases. Furthermore, the ultimate strength of a fully cured part (blue) increases substantially when the blended resin 101 includes a threshold percentage of the second base component 104 (e.g., greater than 50%). Thus, stronger final parts can be obtained by increasing the percentage of the second base component 104. However, as discussed above with reference to FIGS. 3A and 3B, increasing the percentage of the second base component 104 effects viscosity and exposure time (gelation dose).

Additional insights are provided by FIG. 4B, which shows that the ultimate elongation of a fully cured part (blue) increases as a percentage of the second base component 104 in the blended resin 101 increases, and the ultimate elongation of a partially cured part (green) decreases as a percentage of the second base component 104 in the blended resin 101 increases. Accordingly, the first polymer network 120 formed from the first base component 102 becomes increasingly brittle and stiff as the percentage of the second base component 104 in the blended resin 101 increases. Such a result can be desirable as a stiff first polymer network 120 enhances shape fixity (e.g., the deposited layer 227 becomes rigid quickly, and thus is prevented from slumping, bleeding, etc.). The mechanical robustness of the fully cured part (blue) is derived from the second polymer network formed from the second base component 104.

Figure 5A:
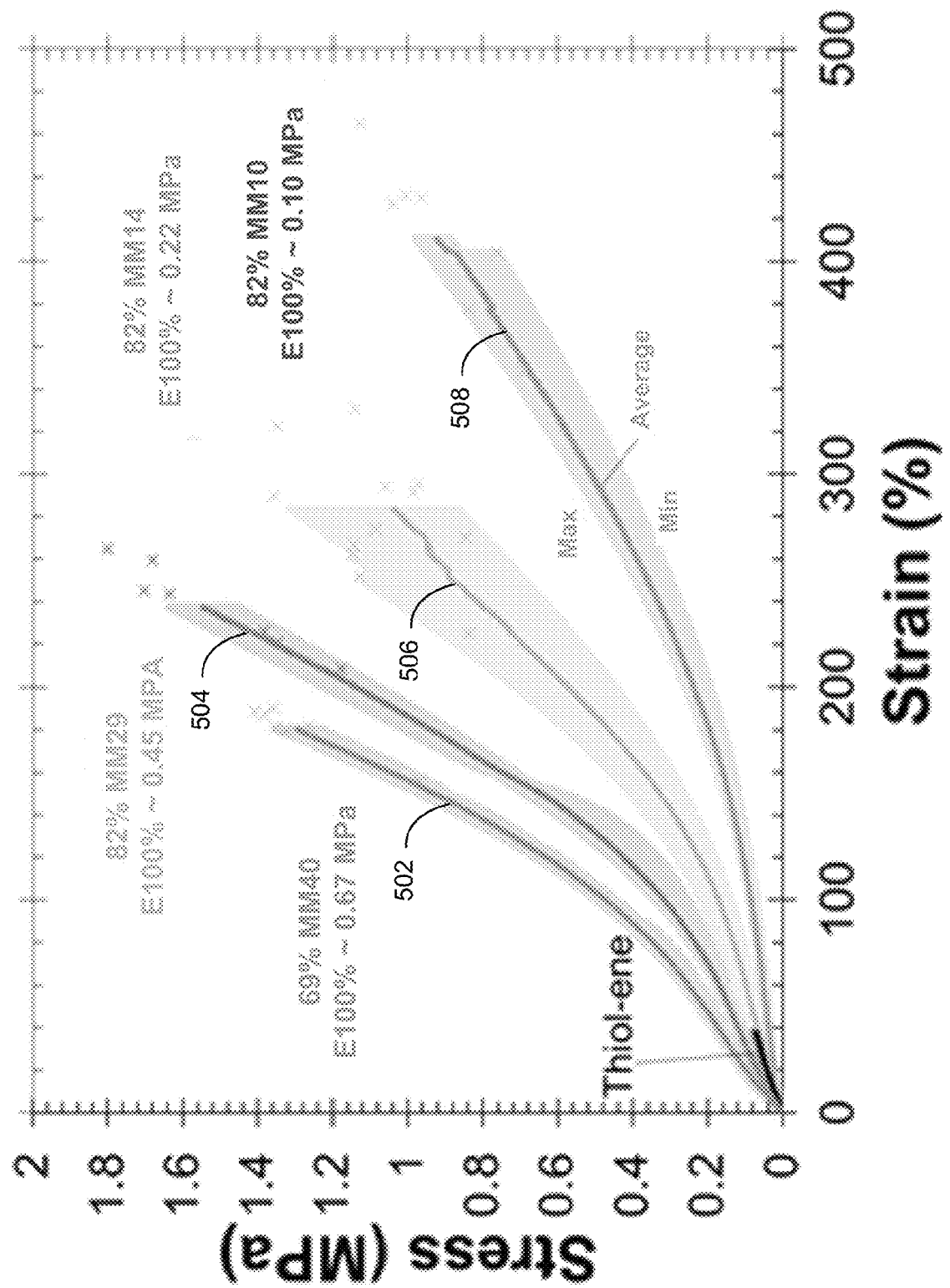
FIG. 5A shows various stress-strain curves of a fully cured part in accordance with some embodiments.

FIG. 5A shows various stress-strain curves of a fully cured part in accordance with some embodiments. Specifically, each of the four curves shown in FIG. 5A corresponds to a different formulation of the second base component 104. For curve 502, the blended resin 101 includes 69% of the second base component 104, which is a commercially available silicone: MOLD MAX 40. For curve 504, the blended resin 101 includes 82% of the second base component 104, which is a commercially available silicone: MOLD MAX 29NV. For curve 506, the blended resin 101 includes 82% of the second base component 104, which is a commercially available silicone: MOLD MAX 14NV. For curve 508, the blended resin 101 includes 82% of the second base component 104, which is a commercially available silicone: MOLD MAX 10T. Each of the commercially available silicones mentioned above are produced by REYNOLDS ADVANCED MATERIALS. In some embodiments, for each illustrated curve, the first base component 102 composes the remaining percentage of the blended resin 101. Alternatively, the first base component 102 along with some other components (e.g., photoinitiators, solvents, and/or additives) can compose the remaining percentage of the blended resin 101.

As shown, various stress-strain curves are obtained, and thus, mechanical properties of a fully cured part made from the blended resin 101 can be adjusted by adjusting/changing the second base component 104. For example, some second base components 104 can be used to increase stress while reducing strain (e.g., as shown with curves 502 and 504), while some second base components 104 can be used to increase strain while reducing stress (e.g., as shown with curves 506 and 508). Accordingly, depending on the application of the fully cured part, inputs of the blended resin 101 can be changed to match the resulting mechanical properties of the fully cured part to its intended application. Additionally, as explained below with reference to FIGS. 12A and 12B, mechanical property gradients can be achieved by attaching two fully cured parts that have different mechanical properties (e.g., one fully cured part is elastic while the other fully cured part is less elastic).

Figure 5B:
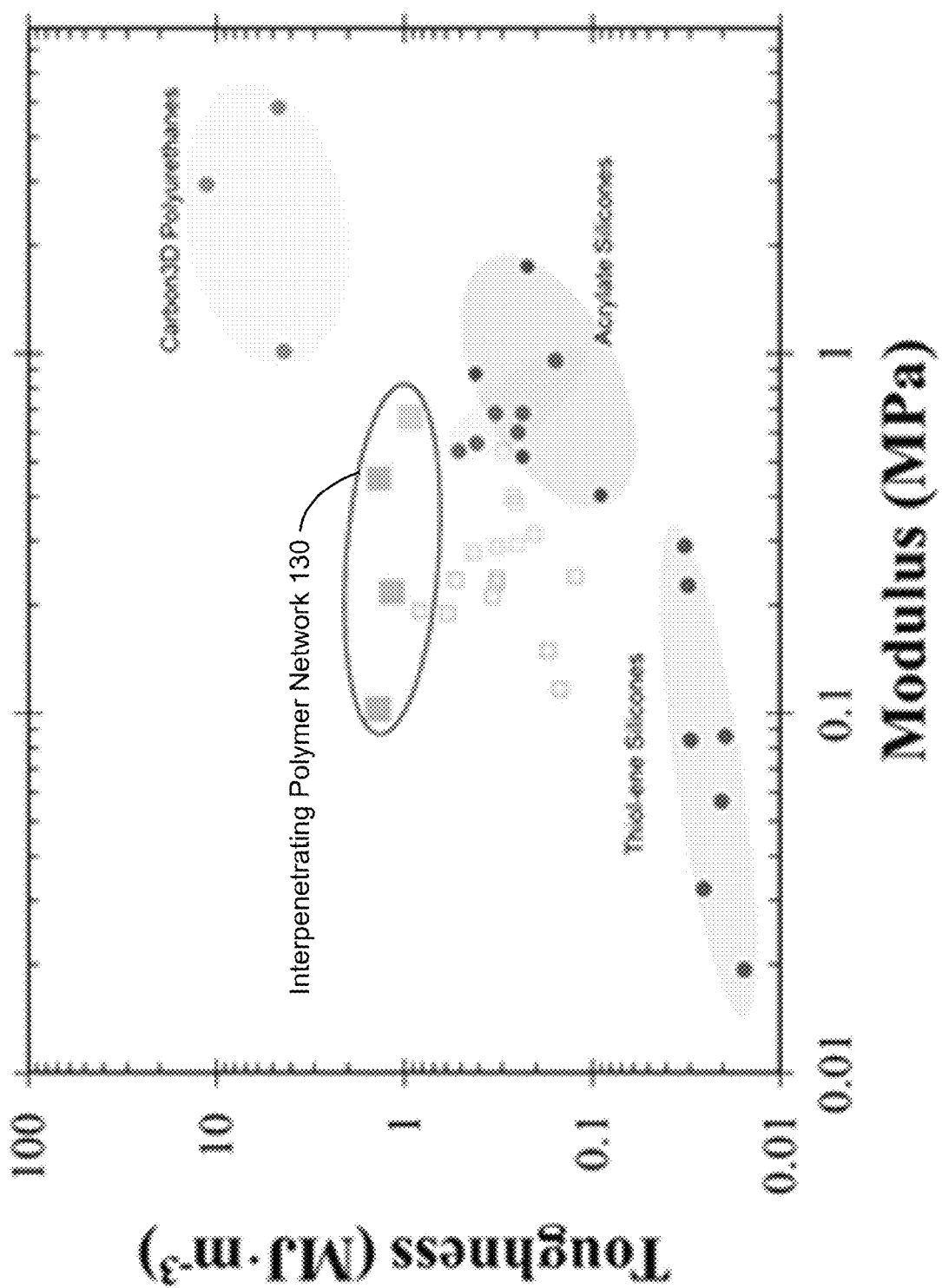
FIG. 5B shows toughness and modulus measurements of various fully cured parts in accordance with some embodiments.

FIG. 5B shows toughness and modulus measurements of various fully cured parts in accordance with some embodiments. As shown, fully cured parts with interpenetrating polymer networks 130 described herein tend to have high toughness (e.g., greater than 1 MJ/m$^3$) at lower elastic moduli (e.g., 0.1 MPa to 0.7 MPa). Also, the chart shows that thiol-ene silicones alone tend to have poor toughness and modulus measurements relative to the circled polymer networks 130.

Figure 5C:
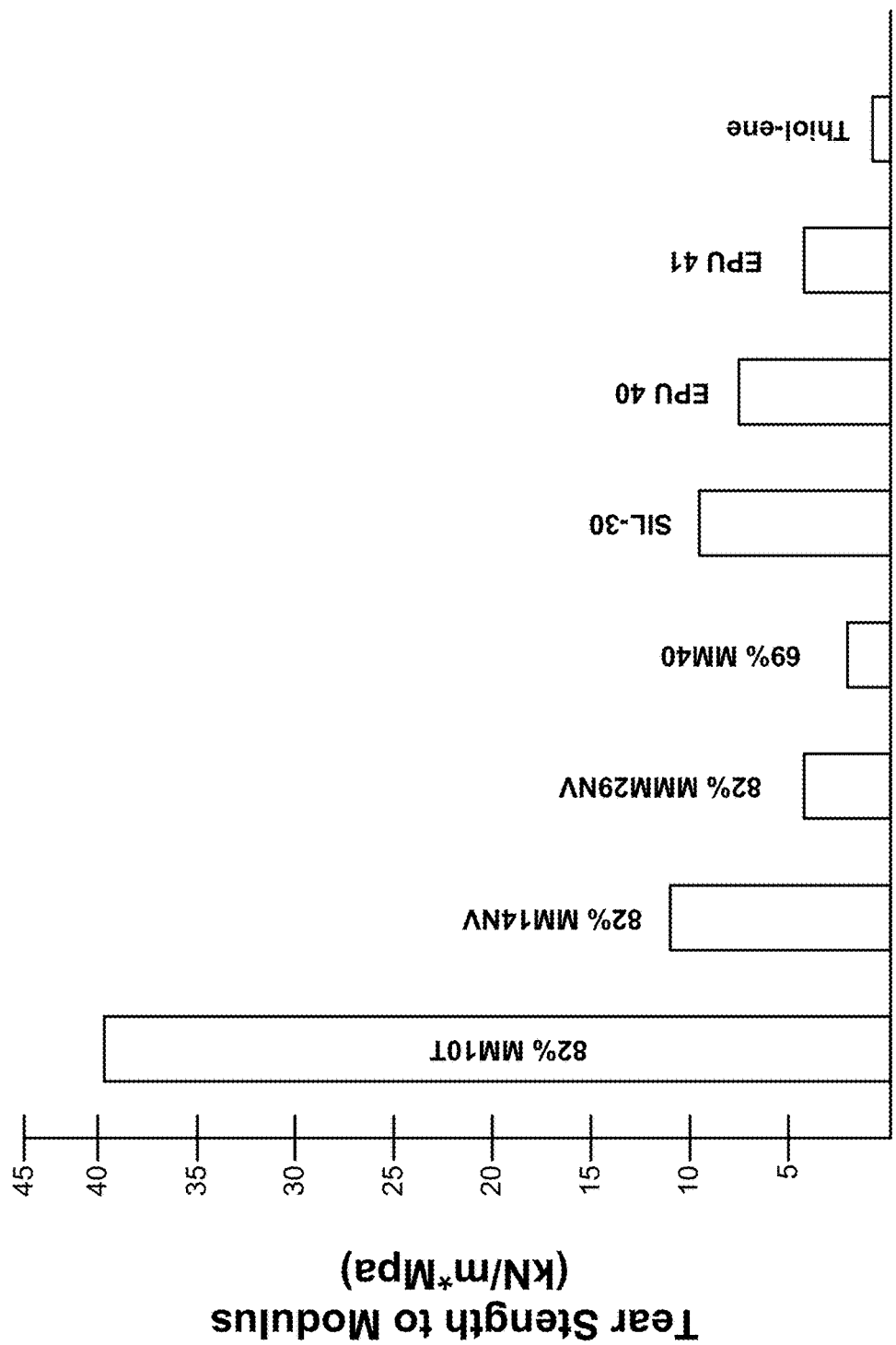
FIG. 5C shows tear strength to modulus measurements of various fully cured parts in accordance with some embodiments.

FIG. 5C shows tear strength to modulus measurements of various fully cured parts in accordance with some embodiments. As shown in the far left column, a fully cured part with the interpenetrating polymer network 130 described herein has a high tear strength to modulus ratio (relative to the other polymers shown in FIG. 5C). Accordingly, if a particular application calls for materials with high tear strength to modulus ratio, the interpenetrating polymer network 130 described herein can be adjusted for said application (e.g., the second base component in the far left column is MOLD MAX 10T produced by REYNOLDS ADVANCED MATERIALS).

Table 2 below shows example mechanical properties of fully cured parts made from different ratios of the first component 102 and the second base component 104. These measurements were conducted in accordance with ASTM standards for elastomers.

TABLE 2

|  | Weight % Second Base Component 104 | 100% Modulus (MPa) | Ultimate Strength (MPa) | Ultimate Elongation (mm/mm) | Toughness (MJ · m$^{-3}$) | Tear Strength (kN/m) |
|---|---|---|---|---|---|---|
| Moldmax 10T | 1 | 0.257 | 2.49 | 4.76 | 4.48 | 12.22 |
|  | 0.82 | 0.103 | 0.92 | 4.11 | 1.37 | 4.00 |
|  | 0.74 | 0.190 | 0.74 | 2.98 | 0.85 | — |
|  | 0.64 | 0.187 | 0.59 | 2.59 | 0.60 | — |
|  | 0.54 | 0.115 | 0.19 | 1.67 | 0.15 | — |
|  | 0.44 | 0.147 | 0.21 | 1.63 | 0.18 | — |
| Moldmax 14NV | 1 | 0.535 | 3.14 | 3.80 | 4.94 | 16.83 |
|  | 0.82 | 0.217 | 1.13 | 2.84 | 1.16 | 2.66 |
|  | 0.74 | 0.231 | 0.66 | 2.14 | 0.55 | — |
|  | 0.64 | 0.226 | 0.45 | 1.78 | 0.34 | — |
|  | 0.55 | 0.207 | 0.43 | 1.91 | 0.35 | — |
|  | 0.44 | 0.234 | 0.40 | 1.81 | 0.33 | — |
| Moldmax 29NV | 1 | 0.886 | 2.87 | 2.97 | 3.63 | 6.69 |
|  | 0.82 | 0.450 | 1.54 | 2.38 | 1.36 | 2.51 |
|  | 0.74 | 0.395 | 0.45 | 1.34 | 0.27 | — |
|  | 0.64 | 0.275 | 0.61 | 1.91 | 0.44 | — |
|  | 0.55 | 0.284 | 0.31 | 1.25 | 0.33 | — |
|  | 0.44 | 0.309 | 0.32 | 1.23 | 0.21 | — |
| Moldmax 40 | 1 | 2.516 | 4.40 | 2.06 | 4.07 | 10.55 |
|  | 0.69 | 0.667 | 1.31 | 1.81 | 0.92 | 2.21 |
|  | 0.64 | 0.527 | 0.55 | 1.19 | 0.30 | — |
|  | 0.54 | 0.378 | 0.44 | 1.27 | 0.26 | — |
|  | 0.44 | 0.291 | 0.39 | 1.42 | 0.26 | — |
| Thiolene | 0 | 0.227 | 0.07 | 0.33 | 0.02 | 0.45 |

Method of Creating 3D Printed Part Using the Novel Polymer Composition

Figure 6B:
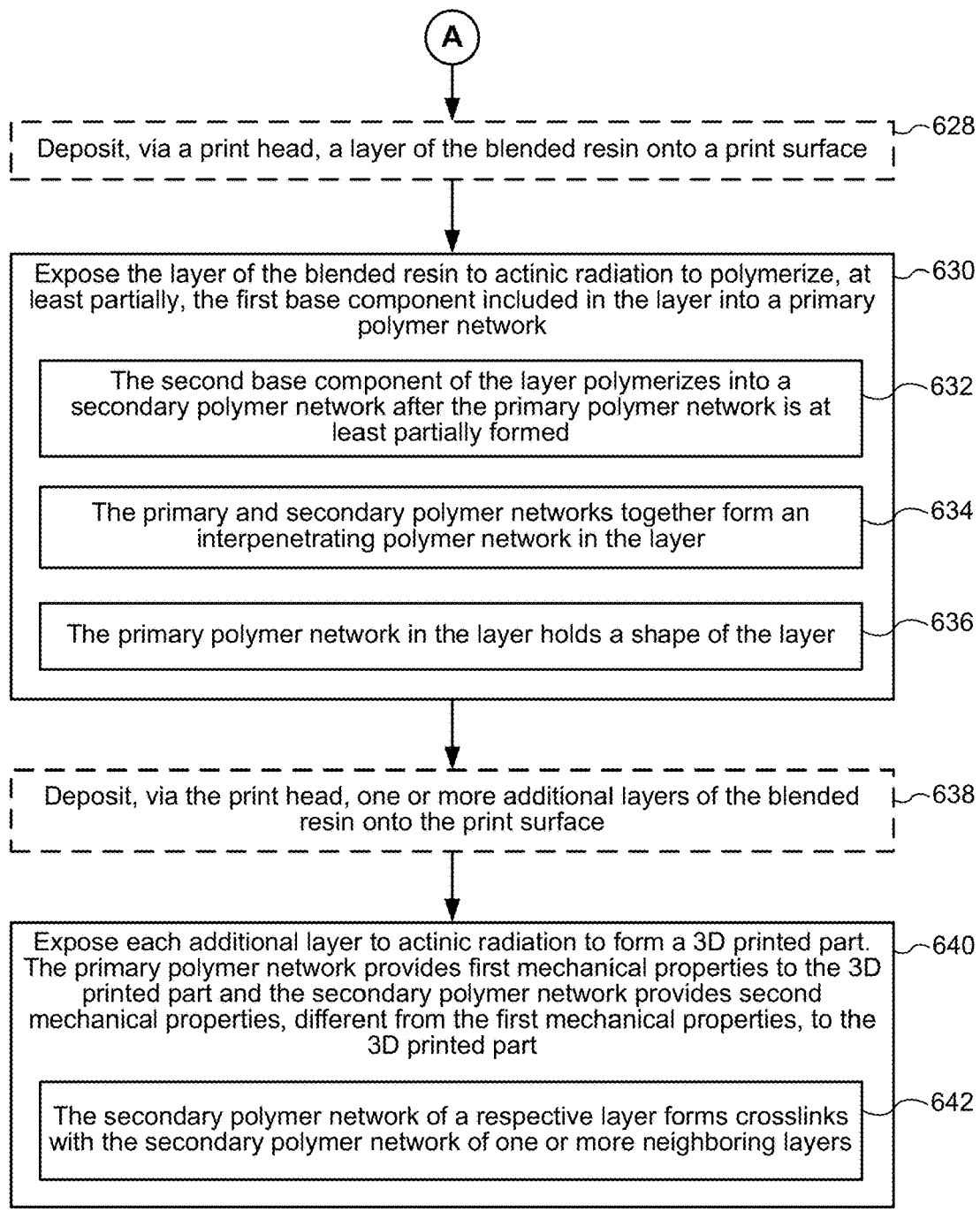

FIGS. 6A-6B show a flowchart of a method 600 for creating a 3D printed part in accordance with some embodiments. Specifically, the 3D printed part includes the interpenetrating polymer network 130 described above. The method 600 can be implemented using various 3D printing processes, including 3D printing, stereolithography, direct ink writing, inkjet 3D printing, holographic printing, tomographic printing, injection molding, and the like.

The method 600 includes blending (602) a first base component (e.g., first base component 102, FIG. 1A), a second base component (e.g., second base component 104, FIG. 1A), and a catalyst to form a blended resin (e.g., blended resin 101, FIG. 1A). In some embodiments, the blending is performed using centrifugation. For example, the first base component, the second base component, and the catalyst may be added together in a high shear mixer at approximately 2000 rpm for at least 30 seconds. The first base component provides printability to the blended resin, e.g., low viscosity, rapid gelation, high reaction conversion, whereas the second base component provides mechanical robustness to a finished part (i.e., a fully cured part). Mechanical and other properties are discussed in further detail above with reference to FIGS. 3A to 5C.

In some embodiments, the blended resin further includes a photoinitiator (604). The photoinitiator allows the blended resin to rapidly polymerize into a solid object during a 3D printing operation. In some embodiments, a first photoinitiator is used when a first 3D printing process is used (e.g., stereolithography) and a second photoinitiator is used when a second 3D printing process is used (e.g., fused deposition modeling, inkjet 3D printing, and the like), where the second photoinitiator polymerizes the blended resin faster than the first photoinitiator. Various photoinitiators can be used, along with various mixtures of photoinitiators. The chemistry of the materials in the blended resin, and finished polymer, is not dependent on the type of or specific photoinitiator used. Photoinitiators are discussed in further detail above with reference to FIG. 1A.

In some embodiments, the first base component is photocurable and includes (i) a first siloxane polymer comprising a plurality of thiol groups (e.g., second polymer component 108, FIG. 1A) and (ii) a second siloxane polymer comprising a plurality of functional groups with unsaturated carbon-carbon bonds (e.g., first polymer component 106, FIG. 1A) (606). In some embodiments, the second siloxane polymer includes a plurality of vinyl groups (608). Alternatively or in addition, in some embodiments, the second siloxane polymer includes a plurality of acrylate groups, vinyl ether groups, methacrylate groups, allyl groups, or the like. In some embodiments, the first base component includes a plurality of first siloxane polymer components and/or a plurality of different (or the same) second siloxane polymer components (610). For example, the first base component may include one or more acrylate groups and one or more vinyl groups (or some other combination of siloxane polymers) for the second siloxane polymer components.

In some embodiments, the first siloxane polymer has a molecular weight below approximately 500,000 daltons (612). In some embodiments, the first siloxane polymer has a molecular weight below approximately 150,000 daltons. In some embodiments, the first siloxane polymer has a molecular weight below approximately 50,000 daltons. Similarly, in some embodiments, the second siloxane polymer has a molecular weight below approximately 500,000 daltons. In some embodiments, the second siloxane polymer has a molecular weight below approximately 150,000 daltons. In some embodiments, the second siloxane polymer has a molecular weight below approximately 50,000 daltons. Molecular weights of the first siloxane polymer and the second siloxane polymer are discussed in further detail above with reference to FIG. 1A.

In some embodiments, the first siloxane polymer has a molar thiol density between 2% and 5% (614), including all 0.1 mol % values and ranges therebetween. In some embodiments, the first siloxane polymer has a molar thiol density between 0.1% and 10%, including all 0.1 mol % values and ranges therebetween. In some embodiments, the first siloxane polymer has a molar thiol density between 0.1% and 100%, including all 0.1 mol % values and ranges therebetween. A molar density of the first siloxane polymer is discussed in further detail above with reference to FIG. 1A.

In some embodiments, the second base component has less than 1% by weight of vinyl groups (and/or any of the functional groups with unsaturated carbon-carbon bonds discussed above) and/or thiol groups to minimize internetwork crosslinking with the first base component during polymerization (616). In this way, the blended resin can be made into final parts composes of an interpenetrating polymer network (discussed in more detail below).

In some embodiments, the second base component is condensation curable via the catalyst (618). A condensation reaction experienced by the second base component can be a step-addition reaction that produces an addition product and release a byproduct, such as water, ethanol, or various other specifies. Furthermore, the second base component includes a plurality of crosslinkable groups distinct from the plurality of thiol groups and the plurality of functional groups with unsaturated carbon-carbon bonds of the first base component. With such a composition, during polymerization of the first base component, the plurality of thiol groups and the plurality of functional groups with unsaturated carbon-carbon bonds do not compete with the plurality of crosslinkable groups to form chemical crosslinks. This is possible because the plurality of thiol groups and the plurality of functional groups with unsaturated carbon-carbon bonds undergo a chemically orthogonal crosslinking reaction, relative to a crosslinking reaction undergone by the plurality of crosslinkable groups.

The second base component can include a third siloxane polymer comprising a plurality of silanol groups (and/or other multifunctional siloxane crosslinkers) (620). Example multifunctional crosslinkers include alcohol, acetoxy, enoxy, oxime, alkoxy, hydride, and amine based systems (and the like). As mentioned above, the second base component provides mechanical robustness to a finished, fully cured part. For example, the second base component provides excellent strength, elongation, and/or toughness mechanical performance over a range of elastic moduli spanning orders of magnitude (250 kPa-2 MPa). In some embodiments, the second base component is a Room-Temperature-Vulcanizing (RTV) silicone (622). As an example, the RTV silicones used can be from the MOLDMAX series produced by REYNOLDS ADVANCED MATERIALS. It is noted that various other RTV silicones can also be used.

In some embodiments, the blended resin has a viscosity below approximately 10 pascal-seconds (624). In some embodiments, the blended resin has a viscosity of approximately 5 pascal-seconds. In some embodiments, the blended resin has a viscosity between 0.01 pascal-seconds to 10 pascal-seconds, including all 0.1 values and ranges therebetween. In some embodiments, the blended resin has the added benefit of being thixotropic which helps maintain a desired viscosity during the printing process (e.g., the resin does not build up on the print head over the course of a printing operation (or multiple printing operations) due to shearing imposed on the resin during the printing process). In some embodiments, the blended resin may be printed at elevated temperatures which reduces the viscosity and increases the rate of reaction of the first base component.

In some embodiments, the first base component is between 10% to 60% by weight of the blended resin (626), including all 0.1 values and ranges therebetween. In some embodiments, the first base component is between 15% to 35% by weight of the blended resin, including all 0.1 values and ranges therebetween. In some embodiments, the first base component is approximately 15% by weight of the blended resin. In some embodiments, the first base component is between 10% to 99% by weight of the blended resin, including all 0.1 values and ranges therebetween. These changes can yield different mechanical properties by affecting, for example, the crosslink density of the first base component (and the second base component), distance between crosslinks, and degree of polymerization for the printed material.

In some embodiments, the blended resin further includes one or more non-reactive diluents, and the one or more non-reactive diluents are up to 80% by weight of the blended resin. Non-reactive diluents (referred to as "solvents") are discussed in further detail above with reference to FIG. 1A.

In some embodiments, the blended resin further includes one or more solid particles, and the one or more solid particulates are up to 50% by weight of the blended resin. Solid particles (referred to as "additives") are discussed in further detail above with reference to FIG. 1A.

In some embodiments, the method 600 includes depositing (628), via a print head, a layer of the blended resin onto a print surface. For example, with reference to FIG. 2B, the blended resin may be housed in an ink cartridge (or some other apparatus, such as a hopper), and a print head 222 of an ink-based 3D printer 220 (and some similar system) may deposit the blended resin in sequential layers to form a 3D printed part 226 (e.g., multiple instances of deposited layer 227). Additionally, a viscosity of the blended resin may be tailored to this particular application. For example, various solvents and/or additives can be added to the blended resin so that the viscosity of the blended resin is suitable for ink-based 3D printing. Moreover, respective percentages of the first base component and the second base component in the blended resin can be adjusted to achieve the desired viscosity.

The method 600 further includes exposing (630) a layer of the blended resin to actinic radiation (e.g., UV radiation) to polymerize, at least partially, the first base component included in the layer into a primary polymer network (e.g., primary polymer network 120, FIG. 1B(iii)). Exposing the blended resin to actinic radiation causes the plurality of thiol groups and the plurality of functional groups with unsaturated carbon-carbon bonds to form a cross-linked primary polymer network. More specifically, exposing the layer to actinic radiation causes a click reaction where a carbon-based sulfhydryl (R—SH) group (i.e., a thiol group) of the first siloxane polymer adds to an alkene (C=C) of the second siloxane polymer to form an alkyl sulfide (=R'—S—CH$_2$—CH$_2$—R') (e.g., crosslink 122, FIG. 1B). The primary polymer network, once partially formed, is configured to provide stiffness to the layer (i.e., provide shape fixity). For example, as shown in FIG. 3A, the blended resin achieves gel transition (e.g., the primary polymer network is at least partially formed) after approximately 2 seconds of exposure to actinic radiation (shown as "gelation"). Once gelation is achieved, the primary polymer network forms a semi-solid, and thus, the layer is prevented from wetting out, slumping, or bleeding. The rapid gelation of the primary polymer network is particularly useful when the blended resin is used as a printable ink, as the deposited layer does not bleed. In some instances, the primary polymer network forms additional crosslinks after the gel transmission.

In those embodiments where the layer is deposited via the print head (628), the actinic radiation is used to polymerize the layer upon deposition. To illustrate, with reference to FIG. 2B, an illumination source may illuminate the working surface 230 with actinic radiation 224 during a printing operation. Furthermore, the illumination source can be directed to follow a path of the print head 222 (e.g., follow the nozzle's 223 path). In this way, the actinic radiation 224 radiated by the illumination source interacts with the layer upon it being deposited by the nozzle 223. In doing so, the ink (i.e., the deposited blended resin) is not able to bleed or run, as noted above, due to the rapid gelation of the primary polymer network.

Alternatively, in some embodiments, the layer is not deposited via a print head and is instead formed using stereolithography (or some similar bath-based process). As described with reference to FIG. 2A, stereolithography is an additive manufacturing technique that uses actinic radiation (e.g., selective or blanket) to cure a liquid resin of photopolymerizable material. By repeating this process, layer-by-layer, a solid object forms. As shown in FIG. 2A, the exposure is selective (e.g., a square pattern), and as a result, the layers shown in FIG. 2A are square shaped.

The second base component of the layer polymerizes into a secondary polymer network after the primary polymer network is at least partially formed (632). The second base component undergoes a step-addition condensation reaction, initiated by the catalyst. Accordingly, the first and second base components polymerize using completely different reactions. The secondary polymer network is typically formed after a couple of hours (i.e., each layer takes a couple of hours to fully cure). In some embodiments, polymerization of the secondary polymer network can be sped up by heating the layer (e.g., a thermal treatment at temperatures between 65 and 200° C. is used to initiate and/or accelerate the condensation reaction). As detailed above, the secondary polymer network provides mechanical robustness, such as strength, elongation, and/or toughness to a fully cured part.

In summary, the first base component is configured to cure (at least partially) in a first amount of time, and the second base component is configured to cure (at least partially) in a second amount of time. The second amount of time is greater than the first amount of time. Accordingly, with reference to FIG. 3B, the blended resin 101 experiences gelation within the first few seconds of being exposed to actinic radiation. Furthermore, a modulus of the final printed part in FIG. 3B continues to increase after 100,000 seconds, which corresponds to the second base component continuing to cure over time at a predefined temperature (e.g., 25° C.).

As explained above, the primary and secondary polymer networks together form an interpenetrating polymer network 130 in the layer (634). In other words, the layer is a material with two distinct, non-interacting polymer networks homogenously occupying the same volume (e.g., there is no phase separation on the order of 10 s of nanometers or greater). In such an arrangement, the layer is able to leverage the mechanical properties of the primary and secondary polymer networks. For example, because the primary polymer network is fairly brittle and the secondary polymer network is tough and elastic, failure of the primary polymer network typically does not cause the secondary polymer network to fail.

In some embodiments, the method 600 further includes depositing (638), via the print head, one or more additional layers of the blended resin onto the print surface. For example, with reference to FIG. 2B, the print head 222 has deposited two layers on the working surface 230. The method 600 may further include (whether or not the depositing operation (638) is performed) exposing (640) each additional layer to actinic radiation to form a 3D printed part.

In some embodiments, the secondary polymer network of a respective layer forms crosslinks with the secondary polymer network of one or more neighboring layers (642). This is made possible by the slow curing kinetics of the second base component during the formation of the primary polymer network from the first base component. For example, with reference to FIG. 2B, a first secondary polymer network in a bottom layer of the 3D printed part 226 may, while curing, form crosslinks with a second secondary polymer network in the deposited layer 227 while the deposited layer 227 is also curing. The crosslinks form at an interface between neighboring layers. As such, layers that compose a 3D printed part are cross-linked together by respective secondary polymer networks, and as a result, an anisotropy of individual layers is decreased as the secondary polymer network forms uniformly in all 3D dimensions, regardless of print direction. Put another way, the secondary polymer network increases adhesion between layers and leads to properties more consistent with the bulk material in a printed part regardless of direction of printing.

Method of Attaching 3D Printed Part to a Substrate

Figure 7:
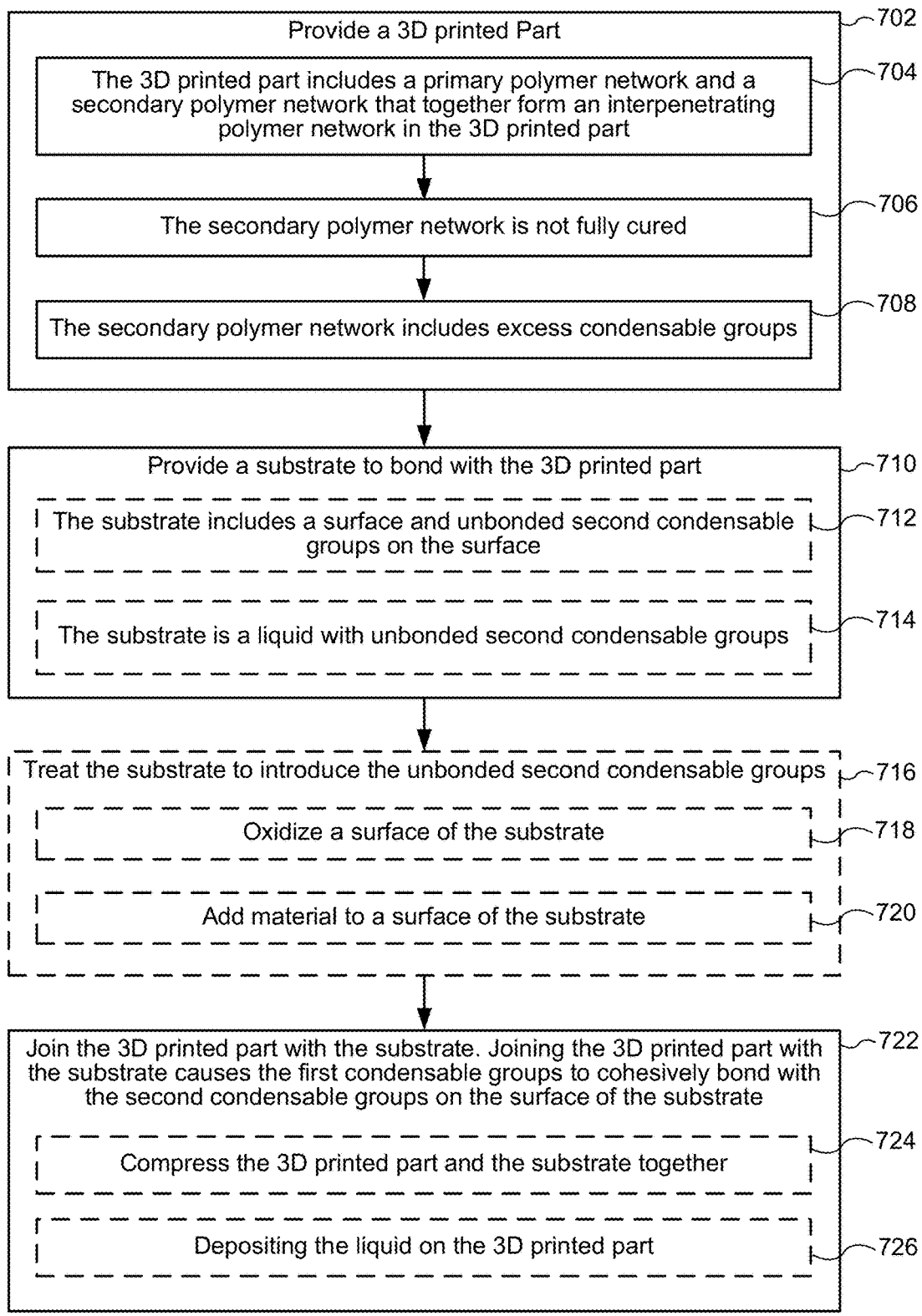
FIG. 7 shows a flowchart of a method 700 for attaching a 3D printed part to a substrate in accordance with some embodiments.

FIG. 7 shows a flowchart of a method 700 for attaching (e.g., cohesively bonding) a 3D printed part to a substrate in accordance with some embodiments. Specifically, the 3D printed part can be fabricated using the method 600, and as a result, the 3D printed part being attached to the substrate includes the interpenetrating polymer network 130 described herein. To assist with describing the method 700, the method 700 will be described with reference to the structures illustrated in FIGS. 8A-8B and 9A-9B.

Figure 8A:
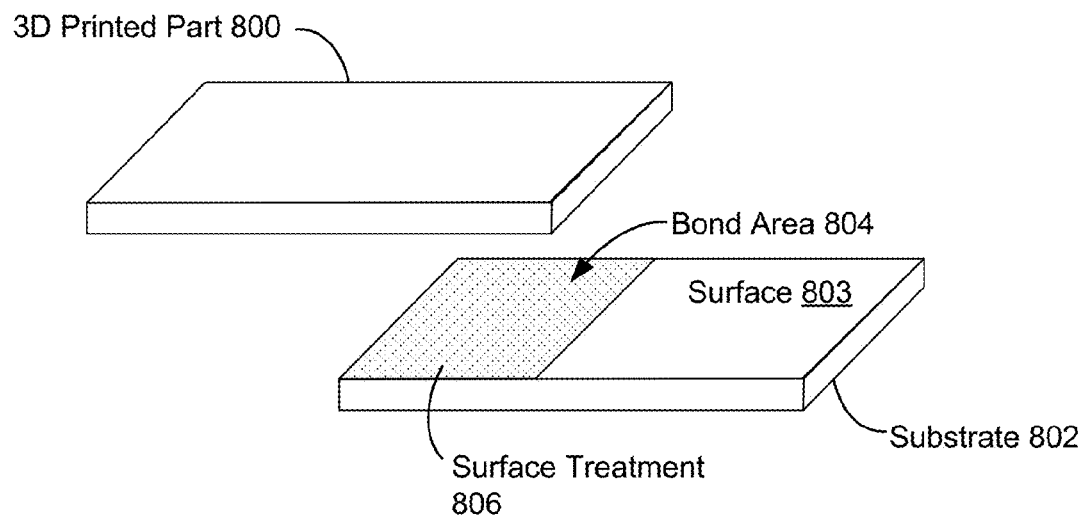
FIGS. 8A-8B illustrate attachment of a 3D printed part to a substrate in accordance with some embodiments.
Figure 8B:
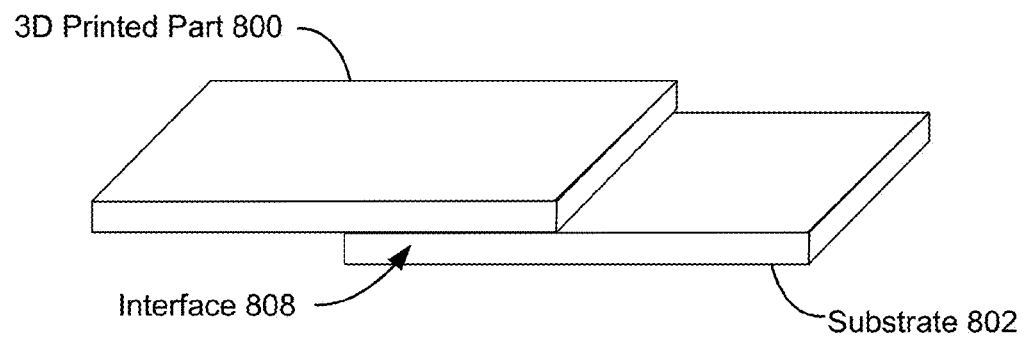
Figure 9A:
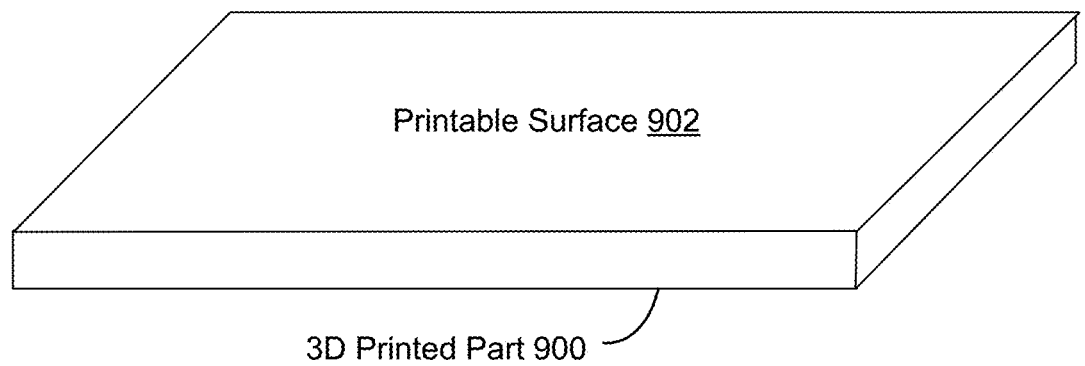
FIGS. 9A-9B illustrate attachment of a coating to a 3D printed part in accordance with some embodiments.

The method 700 includes providing (702) a 3D printed part. Providing the 3D printed part can include performing the method 600 to create (e.g., fabricate) the 3D printed part. For example, the blended resin 101, which includes the first base component 102 and the second base component 104, can be formed, layer-by-layer, into the 3D printed parts shown in FIGS. 2A and 2B. With reference to FIGS. 8A and 9A, example 3D printed parts 800, 900 are provided, respectively. Processes for creating 3D printed parts are discussed in further detail above with reference to FIGS. 6A and 6B.

The 3D printed part provided at step 702 includes: (i) a primary polymer network (e.g., polymer network 120, FIG. 1B(iii)) polymerized by actinic radiation and, (ii) a secondary polymer network (e.g., secondary polymer network 129, FIG. 1B(iv)) polymerized by a condensation reaction. The primary and secondary polymer networks together form an interpenetrating polymer network in the 3D printed part (704).

As described above with reference to FIGS. 3A and 3B, the secondary polymer network takes substantially longer to polymerize (i.e., fully cure) relative to the primary polymer network. In view of this, the 3D printed part is provided when the secondary polymer network is not fully cured (706). Put another way, the secondary polymer network includes excess condensable groups when the 3D printed part is provided (708). For example, the secondary polymer network includes unbonded first condensable groups (e.g., silanol functionalized polysiloxanes or the like) when the 3D printed part is provided. As discussed above at FIGS. 1A and 1B, the secondary polymer network is formed from the second base component 104, and the second base component 104 includes, in some embodiments, silanol functionalized polysiloxanes (and/or other multifunctional siloxane crosslinkers). Accordingly, when the secondary polymer network is not fully cured, some of the silanol functionalized polysiloxanes of the second base component remain unbonded. In such a state, these unbonded silanol functionalized polysiloxanes can form crosslinks either (i) together as the continues to cure, or (ii) with condensable groups found in/on other structures.

The method 700 further includes providing (710) a substrate to bond with the 3D printed part. In some embodiments, the substrate includes a surface and unbonded second condensable groups on the surface (712). For example, with reference to FIG. 8A, the substrate 802 includes a surface 803 with a bond area 804. The bond area 804 is an area where the 3D printed part 800 and the substrate 802 bond together. In some embodiments, the substrate material contains the unbonded second condensable groups (i.e., the substrate has native condensable groups, and thus, a surface treatment is not needed to introduce the unbonded second condensable groups on the substrate's surface). For example, polyurethane and polyurea materials can possess unreacted amine and alcohol groups on their surface. In another example, the substrate may be made from a textile, and the unbonded second condensable groups are innate condensable groups of the textile (and/or condensable groups can be imparted on the textile by surface treatment, as discussed below). Example textiles include but are not limited to polyamide-based textiles like nylon, polyethylene terephthalate (PET) based textiles like polyester, and textile blends that contain at least 1% spandex or 1% of polyester.

Alternatively, in those embodiments where the substrate is provided, the method 700 can include treating (716) the surface of the substrate to introduce the unbonded second condensable groups on the surface of the substrate. For example, with reference to FIG. 8A, the bond area 804 has undergone a surface treatment 806, and the surface treatment 806 includes the unbonded second condensable groups. Various surface treatments can be used to introduce the unbonded second condensable groups on the surface of the substrate, including but not limited to combinations of oxygen plasma treatment, air-plasma (corona) treatments, flame-treatment, chemical etching, and silanization. As an example, the substrate can be made from polymethylmethacrylate (PMMA), and the PMMA substrate can be treated in an oxygen plasma prior to silanization with 3-aminopropyltriethoxysilane (APTES).

In another example, the surface of the substrate is an oxidizable metal, and treating the surface of the substrate to introduce the unbonded second condensable groups on the surface includes oxidizing (718) the surface of the substrate. The oxidizing can result in the formation of various condensable groups, including but not limited to alcohol, acetoxy, enoxy, oxime, alkoxy, hydride, amine, amide, and the like. In another example, treating the surface of the substrate to introduce the unbonded second condensable groups on the surface includes adding (720) an adhesive (e.g., silpoxy or the like) that includes the unbonded second condensable groups to the surface of the substrate.

In some instances, a combination of the surface treatments discussed above can be used. For example, a patterned adhesive may be added to an oxidized surface. Furthermore, a surface treatment may also be added to those materials that include innate or native condensable groups. For example, an adhesive may be added to a textile that includes innate condensable groups.

The method 700 further includes joining (722) the 3D printed part with the substrate. Joining the 3D printed part with the surface of the substrate causes the first condensable groups to cohesively bond (e.g., causes crosslinking between the adjoining surface) with the second condensable groups on the surface of the substrate (e.g., a condensation reaction occurs across the interface). For example, with reference to FIG. 8B, the 3D printed part 800 and substrate 802 are joined together at the bond area 804 (FIG. 8A), and as a result, an interface 808 is created between the two parts. Crosslinking between the 3D printed part and the substrate occurs at the interface 808 as the secondary polymer network of the 3D printed part cures. The crosslinking between the first condensable groups and the second condensable groups on the surface of the substrate forms a single monolithic part, at least at the joining location (i.e., chemical crosslinks have to be broken in order to separate the substrate from the 3D printed part).

In some embodiments, joining the 3D printed part with the surface of the substrate comprises compressing the 3D printed part and the substrate together. Additionally, heat may be added during the compressing to initiate (or speed up) the curing of the 3D printed part. In some embodiments, a compression molder (or the like) is used to perform the compressing.

In some embodiments, the 3D printed part is a first 3D printed part, and the substrate is a second 3D printed part that includes a primary polymer network and a secondary polymer network that together form an interpenetrating polymer network in the second 3D printed part. Like the first 3D printed part, the secondary polymer network of the second 3D printed part is not fully cured when the joining (722) occurs. In this way, the secondary polymer network of the second 3D printed part can form crosslinks with the secondary polymer network of the first 3D printed part at a contact interface (e.g., bond area 804 and interface 808) as the two parts cure.

In some embodiments, a composition of the first 3D printed part and the second 3D printed part is the same. For example, the two parts are made from the same blended resin such that the two parts have the same mechanical properties. Alternatively, in some embodiments, base components polymerized to form the secondary polymer network in the first 3D printed part differ from base components polymerized to form the secondary polymer network in the second 3D printed part. In doing so, the secondary polymer network in the first 3D printed part has a first set of mechanical properties, and the secondary polymer network in the second 3D printed part has a second set of mechanical properties that differ from the first set of mechanical properties. For example, the first 3D printed part may be designed to be stiffer than the second 3D printed part, or vice versa.

In some embodiments, the substrate is a liquid that includes the unbonded second condensable groups (714). Put another way, instead of providing the substrate at 710, the method 700 includes preparing a liquid to deposit on the 3D printed part, where the liquid includes the unbonded second condensable groups. This liquid can include oligomers, polymers, or other molecules with condensable groups (or groups that react with condensable group within the second polymer network).

In such embodiments, the method 700 includes depositing the liquid onto the 3D printed part. Various depositing techniques can be used, including but not limited to airbrushing, ink jetting, spin coating, dip-coating, and the like. To further illustrate, with reference to FIG. 9B, a coating 904 (e.g., the prepared liquid with the unbonded second condensable groups) has been deposited on the 3D printed part 900 in a specific pattern. Areas where the coating 904 contacts the 3D printed part 900 forms an interface 906, and chemical crosslinking between the coating 904 and the 3D printed part 900 occurs at the interface 906. Specifically, depositing the liquid onto the 3D printed causes the first condensable groups to cohesively bond with the second condensable groups included in the deposited liquid (e.g., a condensation reaction occurs across the interface).

Figure 9B:
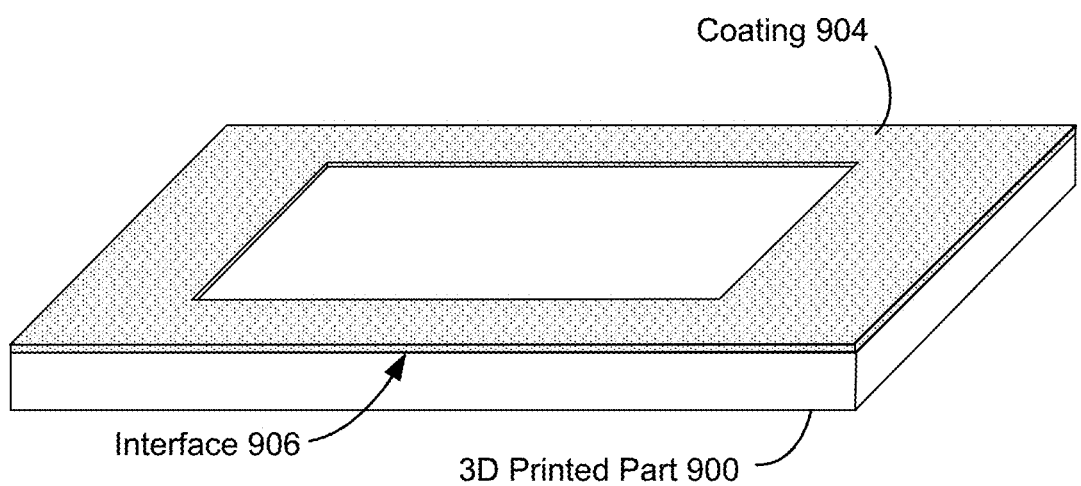

The coating 904 in FIG. 9B can be used to apply favorable surface treatments onto the 3D printed part 900. Such coatings include trichloro(1H,1H,2H,2H-perfluorooctyl)silane solutions to reduce adhesion and promote releasability. In an example, polycarbonate urethanes such as ChronoFlex AR and ChronoFlex AR-LT can be coated onto the 3D printed part 900 to improve durability, resistance to environmentally assisted stress cracking, biocompatibility, and hemocompatibility.

Figure 10A:
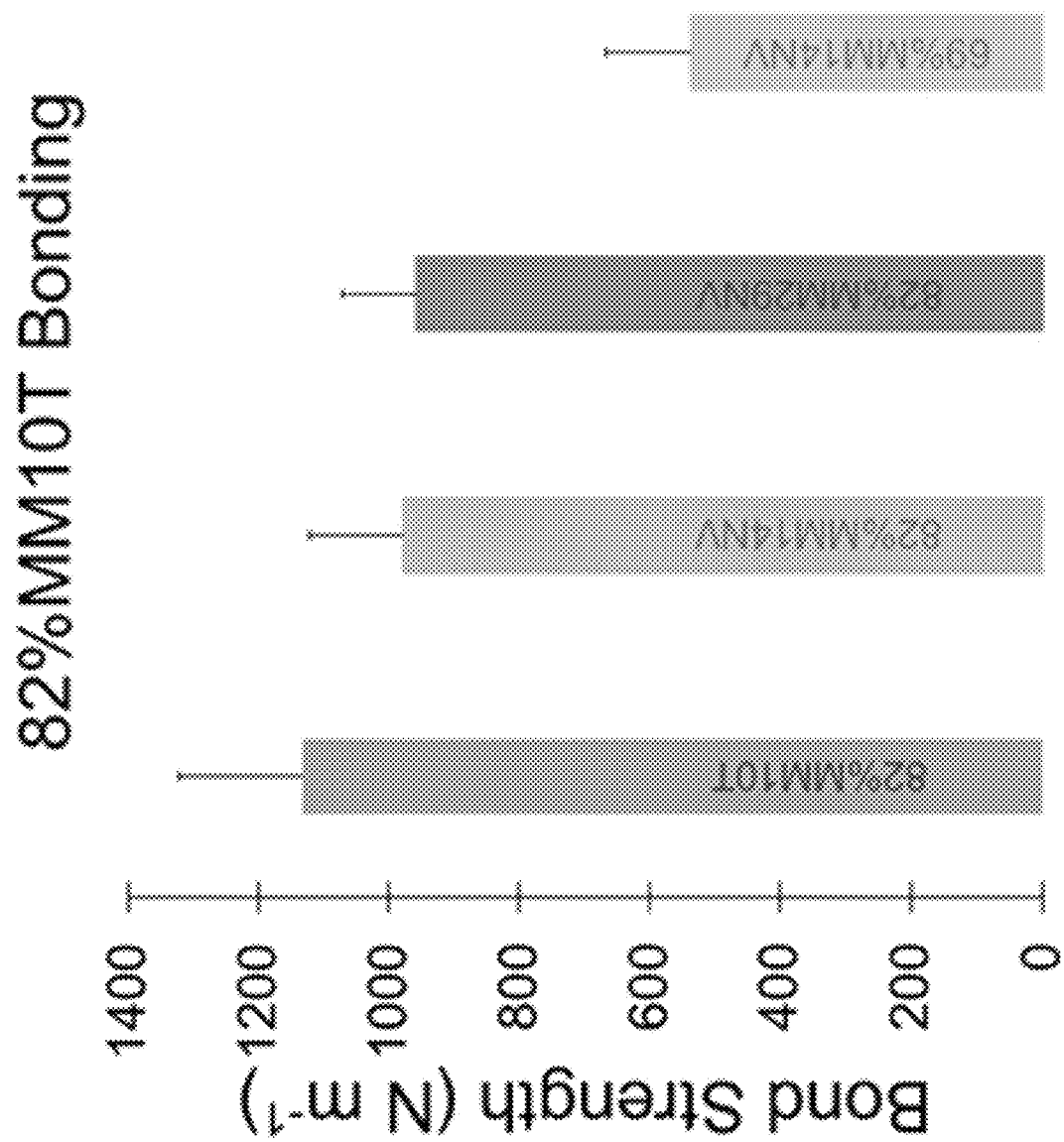
FIG. 10A shows bond strengths between various fully cured parts in accordance with some embodiments.

FIG. 10A shows bond strengths between various fully cured parts (i.e., between two parts with the interpenetrating polymer networks described herein) in accordance with some embodiments. The illustrated bond strengths were measured by a 90-degree peel test. Moreover, for each peel test, one of the fully cured part is the same while the other fully cured parts have different compositions for the second base component 104. For example, the fully cured part that remained the same throughout the testing has a first composition for the second base component 104: 82% MM10T. The labels within each bar shown in FIG. 10A corresponds to the different compositions for the second base component 104 in the other fully cured parts.

Figure 10B:
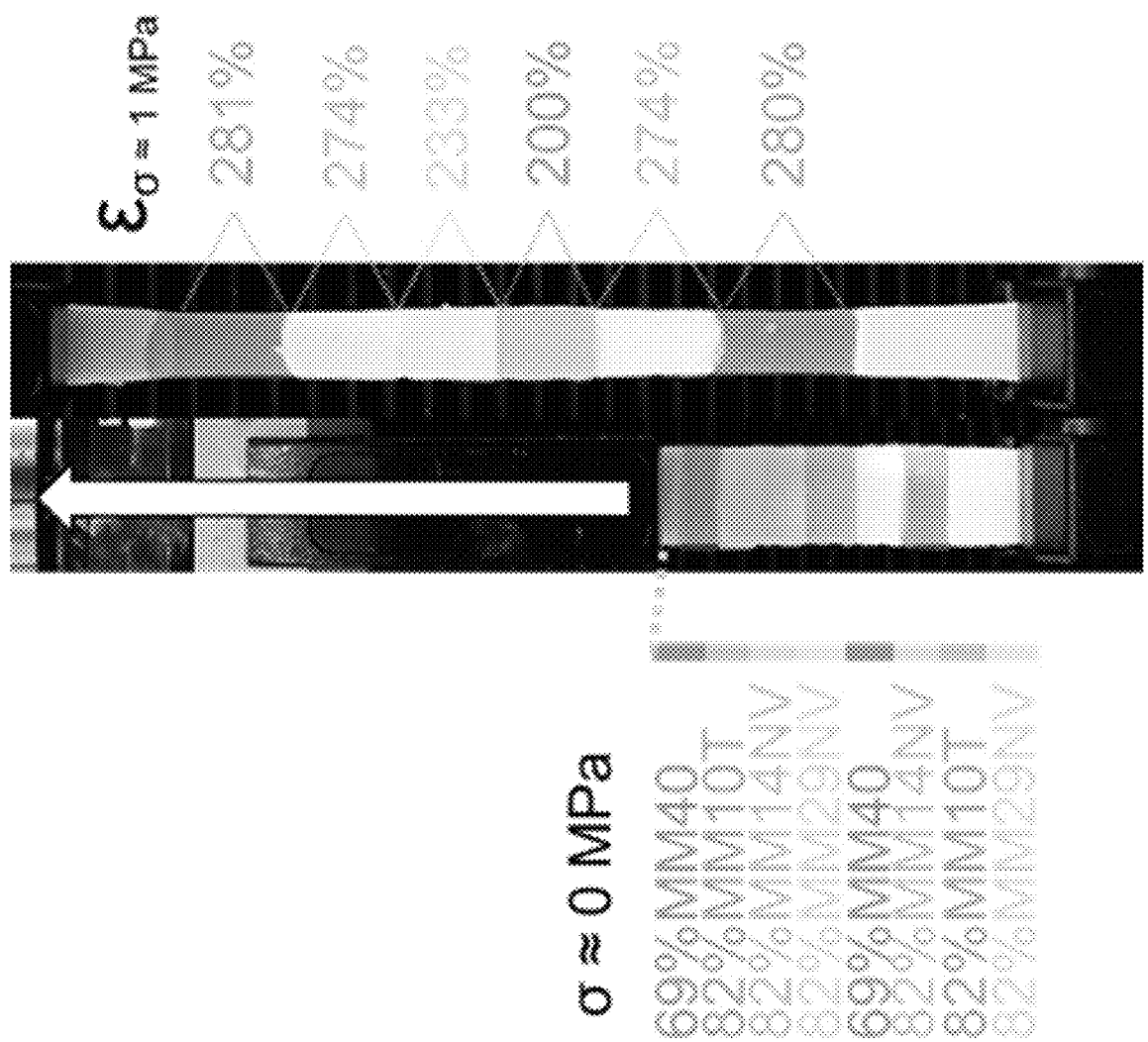
FIG. 10B shows a testing coupon where the coupon is composed of various fully cured 3D printed parts.

FIG. 10B shows a testing coupon where the coupon is composed of various 3D printed parts that are fully cured. The 3D printed parts are fabricated using the techniques described in the method 600, and each part is bonded together using techniques described in the method 700. The coupon on the left has not undergone tensile testing, while the coupon on the right has undergone tensile testing. As shown, each of the 3D printed part produces a different elongation, and each elongation measurement can be attributed, at least partially, to the secondary polymer network in the 3D printed part. Importantly, the coupon was able to withstand 1 MPa of stress without de-bonding.

Figure 11:
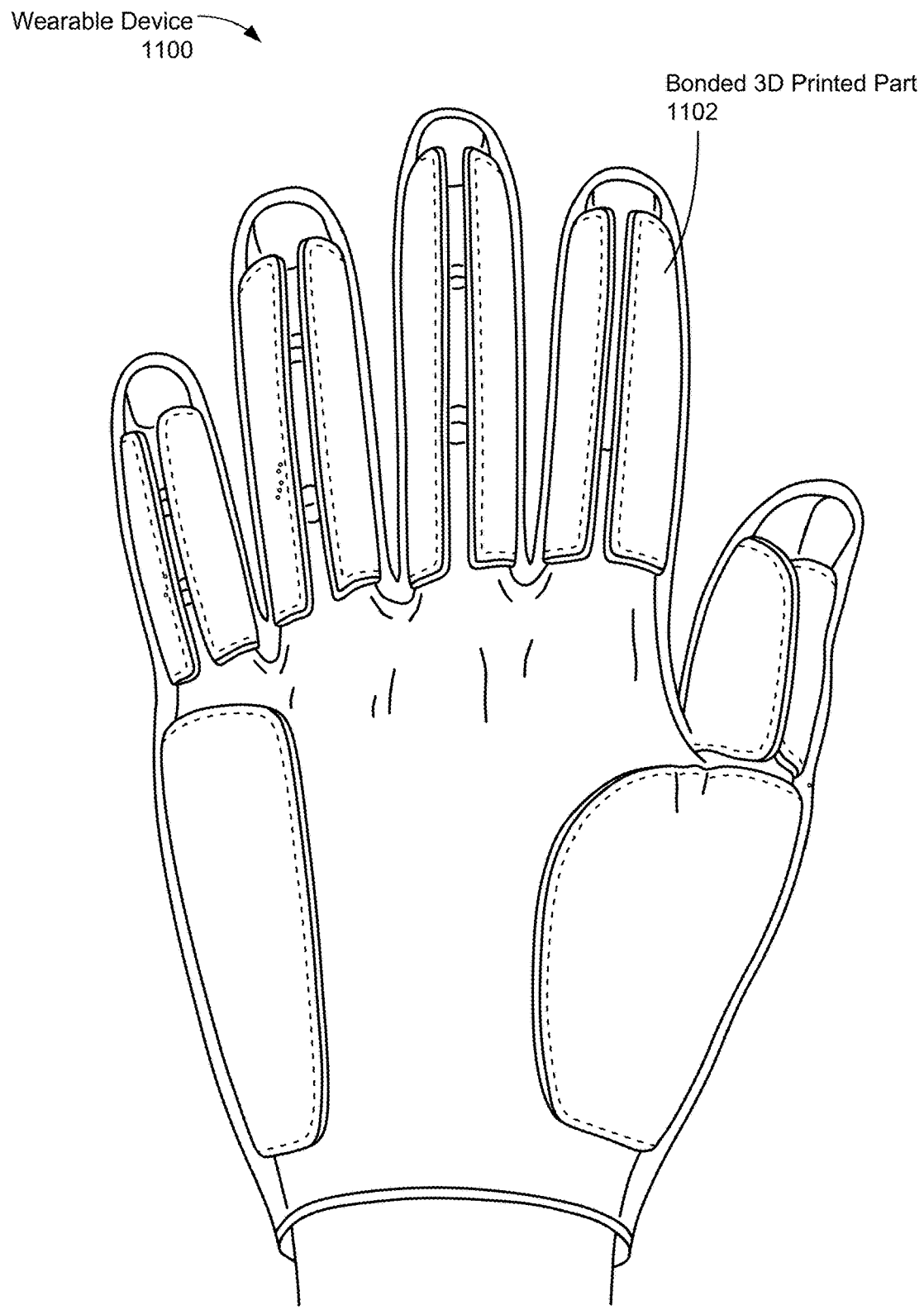
FIG. 11 shows a wearable device having multiple bonded 3D printed parts with mechanical gradients to direct actuation in accordance with some embodiments.

FIG. 11 shows a wearable device 1100 having multiple bonded 3D printed parts 1102 to direct actuation in accordance with some embodiments. Specifically, the wearable device 110 is used to provide haptic stimulations to a wearer of the wearable device 1100. The wearable device 1100 may be part of a virtual reality, augmented reality, or mixed reality system, and the wearable device 1100 is configured to create haptic stimulations that correspond to virtual/augmented events displayed to the user of the system.

The bonded 3D printed parts 1102 included in the wearable device 1100 provide haptic stimulations to the wearer of the wearable device 1100. Each of the bonded 3D printed parts 1102 may be pneumatically/hydraulically coupled to a pressure changing device (e.g., an air or fluid pump), via tubing (not shown). Accordingly, based on signals from a computing device (e.g., a console running the virtual reality system), one or more of the bonded 3D printed parts 1102 can be pressurized (or depressurized). Once pressurized, the bonded 3D printed parts 1102 are configured to change shape and in doing so, provide a haptic stimulation to the wearer. For example, a bonded 3D printed part 1102 positioned on a palmar surface of a wearer's index finger may curl when pressurized, and as a result, the wearer's index finger may also curl (or experience a curling sensation), thereby providing a haptic stimulation to the wearer. In some instances, each of the bonded 3D printed parts 1102 is contained within a bladder to create an air tight environment. Alternatively, in some embodiments, each of the bonded 3D printed parts 1102 has an air-tight internal cavity.

Figure 12A:
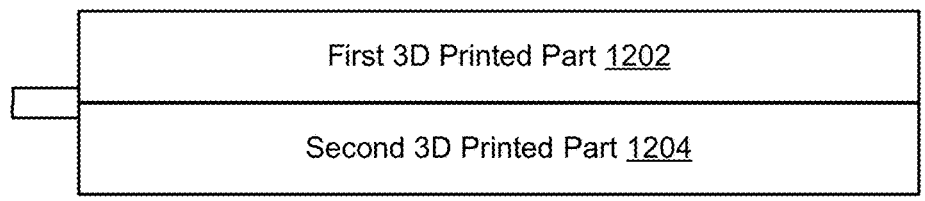
FIGS. 12A-12B show a bonded 3D printed part changing shape in response to being pressurized in accordance with some embodiments.
Figure 12B:
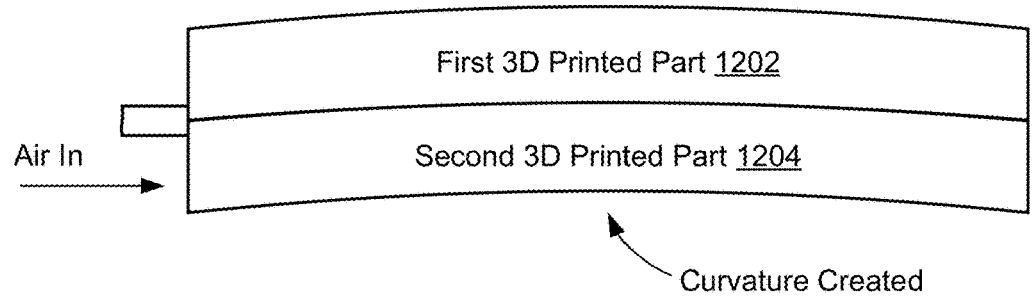

In some instances, each of the bonded 3D printed parts 1102 includes at least one 3D printed part (e.g., created using the techniques disclosed in the method 600) that is bonded to a substrate (e.g., bonded using the techniques disclosed in the method 700). As described above with reference to the method 700, the substrate may or may not be another 3D printed part. For ease of discussion going forward, the bonded 3D printed part 1102 is composed of two 3D printed parts, as shown in FIGS. 12A and 12B. However, as one skilled in the art will appreciate, various numbers of 3D printed parts (and substrates of various mechanical gradients) can compose the bonded 3D printed part 1102 discussed below.

FIGS. 12A-12B show a bonded 3D printed part 1102 transitioning from an unpressurized state (FIG. 12A) to a pressurized state (FIG. 12B) in accordance with some embodiments. Specifically, the bonded 3D printed part 1102 includes a first 3D printed part 1202 bonded (e.g., chemically cross-linked) with a second 3D printed part 1204. The 3D printed parts 1202, 1204 that compose the bonded 3D printed part 1102 are fully cured. For ease of illustration, the bonded 3D printed part 1102 is shown as a flat, planar part; however, various other shapes are possible (e.g., a channel that wrap around a user's finger could also be made, along with various other shapes). Although not shown, the bonded 3D printed part 1102 may include a cavity between the first 3D printed part 1202 and the second 3D printed part 1204, which is configured to receive a medium (e.g., fluid, air, gas, etc.). The first and second 3D printed parts 1202, 1204 may be elastic or inelastic.

Material properties (e.g., elastic versus inelastic) of the first and second 3D printed parts 1202, 1204 can contribute to the shape taken by the bonded 3D printed part 1102. For example, if the first 3D printed part 1202 is highly elastic relative to the elasticity of the second 3D printed part 1204, then the bonded 3D printed part 1102 may be configured to curve (i.e., curl) in a first direction when the bonded 3D printed part 1102 is pressurized, i.e., is in a pressurized state. This result occurs because the first 3D printed part 1202 bulges away from the second 3D printed part 1204, at least partially, when in the pressurized state, due to its elasticity. In some instances, the second 3D printed part 1204 is pulled upwards by the first 3D printed part 1202 when the first 3D printed part 1202 bulges, which results in the wearer experiencing a first haptic stimulation. Conversely, when the first 3D printed part 1202 is highly inelastic relative to an elasticity of the second 3D printed part 1204, then the second 3D printed part 1204 may be configured to curve in a second direction opposite the first direction when the bonded 3D printed part 1102 is pressurized, due to its elasticity. This result occurs because the second 3D printed part 1204 bulges away from the first 3D printed part 1202, at least partially, when in a pressurized state. In such cases, the wearer experiencing a second haptic stimulation different from the first haptic stimulation.

The polymer compositions of the present disclosure and 3D objects made using the polymer compositions have numerous applications and uses. The polymer compositions of the present disclosure provide attractive elastomeric stereolithography chemistries. The interpenetrating polymer networks of the present disclosure provide chemical stability, offer tenability, mechanical robustness, and can outperform resins previously known in the art. For example, soft robotics is a field that needs to fabricate high resolution architectures of elastomeric materials. The ability to rapidly fabricate elastomeric silicones into complex geometries also stands to be a disruptive force in biomedical devices. Silicones are common materials for biomedical devices, and the instant interpenetrating polymer networks are potentially less cytotoxic than their stereolithography counterparts, particularly after post-print bonding or encapsulation by a biocompatible material.

Another application of the polymer compositions of the present disclosure concerns overmolding. Dust, water, and other environmental contaminants can penetrate the housing of an electronic device and cause failure in sensitive components. Currently, silicone based gaskets and seals are overmolded onto rigid substrates for ingress protection of electronic devices (e.g., cell phones, adventure cameras, smartwatches). The ability to form 3D shapes from the interpenetrating polymer networks of the present disclosure, as well as the ability to cohesively bond that silicone material to other substrates allows for complex shaped gaskets and seals that improve ingress protection and/or improve the ease of manufacturing and assembling such components.

As an example, a component to be overmolded could be positioned in a 3D printer, treated as necessary to introduce unbonded second condensable groups (if needed) on a desired surface of the component, and the polymer compositions described herein could then be printed thereon. In another example, the component to be overmolded could be positioned in a mold of an injection molding machine. In this particular example, the injection molding machine is a UV liquid injection molder, where the mold is transparent so UV radiation can penetrate to the mold cavity. With such an injection molder, the process is fairly similar to the process described above with reference to the stereolithography system 200 and the ink-based 3D printer 220. For example, once the component to be overmolded is positioned in a mold, the mold is closed and the blended resin is injected into the mold, thereby filling the mold cavity and covering (at least partially) the component to be overmolded. Thereafter, an illumination source exposes the blended resin in the cavity to UV radiation to cure the blended resin into a partially cured part. Furthermore, once the partially cured part and the component are sufficiently bonded together (as described with reference to the method 700), the mold is opened, the overmolded is part ejected, a new component to be overmolded is positioned in the mold, and the process is repeated.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of 3D printing, comprising exposing a layer of a blended resin to actinic radiation to polymerize, at least partially, forming a primary polymer network,
   wherein the blended resin is homogeneously blended, has a viscosity below 10 pascal-seconds before exposure to the actinic radiation, and comprises a first base component, a second base component, a photoinitiator, and a catalyst; and
   wherein (i) the first base component is photocurable and includes a first siloxane polymer comprising a plurality of thiol groups and a second siloxane polymer comprising a plurality of functional groups with unsaturated carbon-carbon bonds, and (ii) the second base component is condensation curable via the catalyst and includes a third siloxane polymer comprising a plurality of silanol groups.

2. The method of claim 1, further comprising forming a secondary polymer network after the primary polymer network is at least partially formed, wherein the primary and secondary polymer networks together form an interpenetrating polymer network in the layer.

3. The method of claim 1, wherein the primary polymer network in the layer holds a shape of the layer.

4. The method of claim 2, further comprising, before the exposing, depositing, via a print head, the layer of the blended resin onto a print surface.

5. The method of claim 4, further comprising, after the exposing, depositing, via the print head, one or more additional layers of the blended resin onto the layer.

6. The method of claim 5, further comprising exposing each additional layer to actinic radiation to form a 3D printed part, wherein the primary polymer network provides a first set of mechanical properties to the 3D printed part and the secondary polymer network provides a second set of mechanical properties, different from the first set of mechanical properties, to the 3D printed part.

7. The method of claim 6, wherein the secondary polymer network of a respective layer forms chemical crosslinks with the secondary polymer network of one or more neighboring layers.

8. The method of claim 1, further comprising, after exposing the layer of the blended resin to actinic radiation, heating the layer to accelerate polymerization of the second base component in the layer.

9. The method of claim 1, wherein the first base component is between 10% to 60% by weight of the blended resin.

10. The method of claim 1, wherein the second base component includes a plurality of crosslinkable groups distinct from the plurality of thiol groups and the plurality of functional groups with unsaturated carbon-carbon bonds of the first base component.

11. The method of claim 10, wherein the primary polymer network comprises chemical crosslinks formed by the plurality of thiol groups and the plurality of functional groups with unsaturated carbon-carbon bonds.

12. The method of claim 1, wherein the second siloxane polymer comprises a plurality of vinyl groups.

13. The method of claim 1, wherein the first base component further includes a plurality of first siloxane polymer components and/or a plurality of different second siloxane polymer components.

14. The method of claim 1, wherein the first siloxane polymer and/or the second siloxane polymer has a molecular weight below 500,000 Daltons.

15. The method of claim 1, wherein the first siloxane polymer has a mole percent of thiol groups between 2% and 5%.

16. The method of claim 1, wherein the blended resin further comprises one or more non-reactive diluents.

17. The method of claim 16, wherein the non-reactive diluents comprise 50% to 80% by weight of the blended resin.

* * * * *